US009505979B2

(12) United States Patent
Lee et al.

(10) Patent No.: US 9,505,979 B2
(45) Date of Patent: Nov. 29, 2016

(54) POLYMERIZABLE LIQUID CRYSTAL COMPOUNDS, LIQUID CRYSTAL COMPOSITION COMPRISING THE COMPOUNDS, AND OPTICAL FILM COMPRISING THE COMPOSITION

(71) Applicant: LG CHEM, LTD., Seoul (KR)

(72) Inventors: Min Hyung Lee, Daejeon (KR); Young Jee Song, Daejeon (KR); Sung-Ho Chun, Daejeon (KR); Kyung Chang Seo, Daejeon (KR); Hyeong Bin Jang, Daejeon (KR); Ji Young Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/914,567

(22) PCT Filed: Sep. 19, 2014

(86) PCT No.: PCT/KR2014/008750
§ 371 (c)(1),
(2) Date: Feb. 25, 2016

(87) PCT Pub. No.: WO2015/046825
PCT Pub. Date: Apr. 2, 2015

(65) Prior Publication Data
US 2016/0200977 A1    Jul. 14, 2016

(30) Foreign Application Priority Data

Sep. 30, 2013 (KR) .................. 10-2013-0116535
Sep. 18, 2014 (KR) .................. 10-2014-0124469

(51) Int. Cl.
*C09K 19/30* (2006.01)
*C09K 19/38* (2006.01)
*C07C 69/76* (2006.01)
*C09K 19/14* (2006.01)
*C08F 138/00* (2006.01)
*C09K 19/04* (2006.01)

(52) U.S. Cl.
CPC .......... *C09K 19/3068* (2013.01); *C09K 19/14* (2013.01); *C09K 19/3804* (2013.01); *C09K 19/3833* (2013.01); *C09K 2019/0448* (2013.01); *C09K 2019/3075* (2013.01)

(58) Field of Classification Search
CPC .......... C09K 19/3068; C09K 19/3804; C09K 19/3833; C09K 2019/0448
USPC ........... 252/299.61, 299.62, 299.63; 526/285
See application file for complete search history.

(56) References Cited

FOREIGN PATENT DOCUMENTS

| JP | 2000-169403 A | 6/2000 |
|---|---|---|
| JP | 2001-011458 A | 1/2001 |
| JP | 2001-011459 A | 1/2001 |
| JP | 2007-070285 A | 3/2007 |

(Continued)

*Primary Examiner* — Fred M Teskin
(74) *Attorney, Agent, or Firm* — Dentons US LLP

(57) ABSTRACT

The present invention relates to a polymerizable liquid crystal compound, a liquid crystal composition including the same, and an optical film including the same. The polymerizable liquid crystal compound according to the present invention has at least two functional groups making intermolecular interaction possible in its molecule, and thus it is possible to form a liquid crystal layer having high orientation stability by coating the composition including the same. According to this, the optical film prepared by using the composition can be suitably used in anti-reflection films and so on for liquid crystal displays or OLED displays.

7 Claims, 11 Drawing Sheets

(56) References Cited

FOREIGN PATENT DOCUMENTS

| | | |
|---|---|---|
| JP | 2008-110948 A | 5/2008 |
| JP | 2010-241791 A | 10/2010 |
| JP | 2011-148762 A | 8/2011 |
| KR | 10-2002-0019619 A | 3/2007 |
| KR | 10-2008-0054383 A | 6/2008 |
| KR | 10-2006-0119879 A | 11/2012 |
| KR | 10-2010-0085929 A | 3/2015 |
| WO | 2011/050896 A1 | 5/2011 |

POLYMERIZABLE LIQUID CRYSTAL COMPOUNDS, LIQUID CRYSTAL COMPOSITION COMPRISING THE COMPOUNDS, AND OPTICAL FILM COMPRISING THE COMPOSITION

This application is a National Stage Entry of International Application No. PCT/KR2014/008750, filed Sep. 19, 2014, and claims the benefit of and priority to Korean Application Nos. 10-2013-0116535, filed on Sep. 30, 2013, and 10-2014-0124469, filed on Sep. 18, 2014, all of which are hereby incorporated by reference in their entirety for all purposes as if fully set forth herein.

TECHNICAL FIELD

The present invention relates to a polymerizable liquid crystal compound, a liquid crystal composition including the same, and an optical film including the same.

BACKGROUND OF ART

As the share of LCDs (Liquid Crystal Displays) increases in display field, interest in OLED (Organic Light Emitting Diode) displays being mentioned as a next-generation display is rising.

The OLED display is being spotlighted as a future display, because it is superior to the LCD in various aspects of thickness, power consumption, response speed, viewing angle, and so on, and can be applied to various applications such as transparent products and flexible products.

However, use of the OLED is still limited because of its short lifespan and low emitting efficiency, and particularly it has a disadvantage in that it is difficult to realize perfect black because of interference by external light.

For realizing more perfect black, a method of using two sheets of polarizing film for the OLED display was suggested for minimizing the interference by external light. The method of using two sheets of polarizing film is relatively simple, but there is a problem that it may affect the definition of the display and the production cost increases.

Therefore, various methods for minimizing interference of external light such as a method of using a reverse wavelength dispersion liquid crystal film instead of the polarizing film have been suggested, but their effects are insufficient thus far.

DETAILED DESCRIPTION OF THE INVENTION

Technical Problem

It is an aspect of the present invention to provide a polymerizable liquid crystal compound that makes it possible to form a liquid crystal layer having high orientation stability and that can be more suitably used as an anti-reflective film and the like.

Furthermore, it is another aspect of the present invention to provide a polymerizable liquid crystal composition and an optical film including the same.

Technical Solution

According to the present invention, a polymerizable liquid crystal compound represented by the following Chemical Formula 1 is provided.

[Chemical Formula 1]

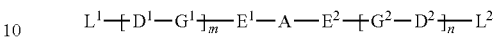

In Chemical Formula 1,

A, $G^1$, and $G^2$ are independently a $C_5$-$C_8$ non-aromatic carbocyclic or heterocyclic group, or a $C_6$-$C_{20}$ aromatic or heteroaromatic group;

$E^1$, $E^2$, $D^1$, and $D^2$ are independently a single bond or a divalent connecting group;

$L^1$ and $L^2$ are independently —H, —F, —Cl, —Br, —I, —CN, —NC, —NCO, —OCN, —SCN, —C(=O)NR$^1$R$^2$, —C(=O)R$^1$, —O—C(=O)R$^1$, —NH$_2$, —SH, —SR$^1$, —SO$_3$H, —SO$_2$R$^1$, —OH, —NO$_2$, —CF$_3$, —SF$_3$, a substituted or non-substituted silyl, a substituted or non-substituted $C_1$-$C_{40}$ carbyl or hydrocarbyl, or —S$_p$—P, wherein at least one of said $L^1$ and $L^2$ are —S$_p$—P, said P is a polymerizable group, said S$_p$ is a spacer group or a single bond, and $R^1$ and $R^2$ are independently —H or a $C_1$-$C_{12}$ alkyl;

m and n are independently an integer of 1 to 5, wherein if said m or n is 2 or more, each repeating unit of -($D^1$-$G^1$)- or -($G^2$-$D^2$)- repeated twice or more may be the same as or different from each other; and two or more of hydrogens connected to the sp$^2$-hybridized carbon and sp$^3$-hybridized carbon included in A, $E^1$, $E^2$, $D^1$, $D^2$, $G^1$, $G^2$, $L^1$, and $L^2$ are substituted by —F, —Cl, —Br, —I, —CN, —NC, —NCO, —OCN, —SCN, —C(=O)NR$^1$R$^2$, —C(=O)R$^1$, —NH$_2$, —SH, —SR$^1$, —SO$_3$H, —SO$_2$R$^1$, —OH, —NO$_2$, —CF$_3$, —SF$_3$, a $C_2$-$C_6$ alkenyl group, a $C_2$-$C_6$ alkynyl group, a $C_2$-$C_4$ acyl group, a $C_2$-$C_6$ alkynylene group of which the end is connected with a $C_2$-$C_4$ acyl group, a $C_1$-$C_5$ alcohol group, or a $C_1$-$C_{12}$ alkoxy group, wherein said $R^1$ and $R^2$ are independently —H or a $C_1$-$C_{12}$ alkyl.

According to the present invention, a polymerizable liquid crystal composition including the compound represented by Chemical Formula 1 is also provided.

According to the present invention, an optical film formed by using the polymerizable liquid crystal composition is also provided.

Hereinafter, the polymerizable liquid crystal compound, the composition including the same, and the optical film according to the embodiments of the present invention are explained.

Prior to this, technical terms in the present specification are only for mentioning specific embodiments and they are not intended to restrict the present invention, unless there is a particular mention to the contrary. Further, singular expressions used herein may include plural expressions unless they are differently expressed contextually.

The meaning of the term "include" used in the specification embodies specific characteristics, areas, essences, steps, actions, elements, or components, and does not exclude other specific characteristics, areas, essences, steps, actions, elements, or components.

Further, "polymerizable liquid crystal compound" means a liquid crystal compound having at least one polymerizable group. The compound can be formed into a polymer having a fixed orientation structure of liquid crystal molecules by exposing the compound to an active energy ray after aligning the composition including the polymerizable liquid crystal compound in a liquid crystal state. The polymer obtained in this way shows anisotropy in physical properties such as refractive index, dielectric constant, magnetic susceptibility, modulus, thermal expansion rate, and so on. For example, it may be applied to an optically anisotropic body such as a retardation plate, a polarizing plate, a polarizing prism, a brightness enhancing film, a covering material of an optical fiber, and so on.

In addition, "mesogenic group" means a group having the ability to induce the liquid crystalline behavior.

Further, "spacer group" is known to a person skilled in the art to which the present invention pertains, and for example, it is disclosed in the literature [C. Tschierske, G. Pelzl, S. Diele, Angew. Chem. 2004, 116, 6340-6368]. Said spacer group is designated as a flexible organic group that connects the mesogenic group and the polymerizable group.

Additionally, "carbyl group" means an arbitrary monovalent or polyvalent organic radical residue that includes one or more carbon atoms (for example, —C≡C—) without an arbitrary non-carbon atom, or one or more carbon atoms (for example, carbonyl) selectively combined with one or more non-carbon atoms (for example, N, O, S, P, and Si). "Hydrocarbyl group" means a carbyl group including one or more H atoms in addition, and one or more selective heteroatoms (for example, N, O, S, P, and Si).

I. Polymerizable Liquid Crystal Compound

According to one embodiment of the present invention, the polymerizable liquid crystal compound represented by the following Chemical Formula 1 is provided.

[Chemical Formula 1]

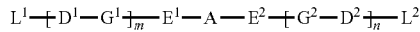

In Chemical Formula 1,

A, $G^1$, and $G^2$ are independently a $C_5$-$C_8$ non-aromatic carbocyclic or heterocyclic group or a $C_6$-$C_{20}$ aromatic or heteroaromatic group;

$E^1$, $E^2$, $D^1$, and $D^2$ are independently a single bond or a divalent connecting group;

$L^1$ and $L^2$ are independently —H, —F, —Cl, —Br, —I, —CN, —NC, —NCO, —OCN, —SCN, —C(=O)NR$^1$R$^2$, —C(=O)R$^1$, —O—C(=O)R$^1$, —NH$_2$, —SH, —SR$^1$, —SO$_3$H, —SO$_2$R$^1$, —OH, —NO$_2$, —CF$_3$, —SF$_3$, a substituted or non-substituted silyl, a substituted or non-substituted $C_1$-$C_{40}$ carbyl or hydrocarbyl, or —S$_p$—P, wherein at least one of said $L^1$ and $L^2$ are —S$_p$—P, said P is a polymerizable group, said S$_p$ is a spacer group or a single bond, and R$^1$ and R$^2$ are independently —H or a $C_1$-$C_{12}$ alkyl;

m and n are independently an integer of 1 to 5, wherein if said m or n is 2 or more, each repeating unit of -(D$^1$-G$^1$)- or -(G$^2$-D$^2$)- repeated twice or more may be same as or different from each other; and two or more of hydrogens connected to the sp$^2$-hybridized carbon and sp$^3$-hybridized carbon included in A, E$^1$, E$^2$, D$^1$, D$^2$, G$^1$, G$^2$, L$^1$, and L$^2$ are substituted by —F, —Cl, —Br, —I, —CN, —NC, —NCO, —OCN, —SCN, —C(=O)NR$^1$R$^2$, —C(=O)R$^1$, —NH$_2$, —SH, —SR$^1$, —SO$_3$H, —SO$_2$R$^1$, —OH, —NO$_2$, —CF$_3$, —SF$_3$, a $C_2$-$C_6$ alkenyl group, a $C_2$-$C_6$ alkynyl group, a $C_2$-$C_4$ acyl group, a $C_2$-$C_6$ alkynylene group of which the end is connected with a $C_2$-$C_4$ acyl group, a $C_1$-$C_5$ alcohol group, or a $C_1$-$C_{12}$ alkoxy group, wherein said R$^1$ and R$^2$ are independently —H or a $C_1$-$C_{12}$ alkyl.

As results of the continuing experiments of the present inventors, it is recognized that the compound having the structure like Chemical Formula 1 makes it possible to form a liquid crystal layer having higher orientation stability.

In this connection, prior liquid crystal compounds are weak in intermolecular interaction, and thus they have a problem of destroying the orientation when they are highly stacked up during the orientation process. However, the compound represented Chemical Formula 1 has the molecular structure to which at least two functional groups making the intermolecular interaction possible are introduced.

Therefore, the polymerizable liquid crystal compound represented by Chemical Formula 1 is relatively strong in the intermolecular interaction and makes it possible to form a liquid crystal layer having high orientation stability. According to the embodiment of the present invention, two or more functional groups making the intermolecular interaction possible may be introduced to the sp$^2$-hybridized carbon and sp$^3$-hybridized carbon included in A, E$^1$, E$^2$, D$^1$, D$^2$, G$^1$, G$^2$, L$^1$, and L$^2$ in Chemical Formula 1.

A, G$^1$, and G$^2$ in Chemical Formula 1 are independently a $C_5$-$C_8$ non-aromatic carbocyclic or heterocyclic group or a $C_6$-$C_{20}$ aromatic or heteroaromatic group.

The carbocyclic or heterocyclic group in said A, G$^1$, and G$^2$ may be a 5-membered ring (for example, cyclopentane, tetrahydrofuran, tetrahydrothiofuran, and pyrrolidine); a 6-membered ring (for example, cyclohexane, silinane, cyclohexene, tetrahydropyran, tetrahydrothiopyran, 1,3-dioxane, 1,3-dithiane, and piperidine); a 7-membered ring (for example, cycloheptane); or a fused group (for example, tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, and octahydro-4,7-methano-indane-2,5-diyl), and so on.

The aromatic group in said A, G$^1$, and G$^2$ may be benzene, biphenylene, triphenylene, naphthalene, anthracene, binaphthylene, phenanthrene, pyrene, dihydropyrene, chrysene, perylene, tetracene, pentacene, benzpyrene, fluorene, indene, indenofluorene, spirobifluorene, and so on. The heteroaromatic group in said A, G$^1$, and G$^2$ may be a 5-membered ring (for example, pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, and 1,3,4-thiadiazole); a 6-membered ring (for example, pyridine, pyridazine, pyrimidine, pyrazine, 1,3,5-triazine, 1,2,4-triazine, 1,2,3-triazine, 1,2,4,5-tetrazine, 1,2,3,4-tetrazine, and 1,2,3,5-tetrazine); or a fused group (for example, carbazole, indole, isoindole, indolizine, indazole, benzimidazole, benzotriazole, purine, naphthimidazole, phenanthrimidazole, pyridimidazole, pyrazineimidazole, quinoxalineimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3-b]thiophene, thieno[3,2-b]

thiophene, dithienothiophene, dithienopyridine, isobenzothiophene, dibenzothiophene, benzothiadiazothiophene), and so on.

Preferably, said A, $G^1$, and $G^2$ may independently be a cyclohexane ring, a cyclohexene ring, a benzene ring, a naphthalene ring, or a phenanthrene ring. More preferably, said A, $G^1$, and $G^2$ may independently be selected from the group consisting of trans-1,4-cyclohexylene, 1,4-phenylene, 1,5-naphthylene, and 2,6-naphthylene.

In addition, $E^1$, $E^2$, $D^1$, and $D^2$ in Chemical Formula 1 are independently a single bond or a divalent connecting group.

Concretely, $E^1$, $E^2$, $D^1$, and $D^2$ may independently be a single bond, —O—, —S—, —CO—, —COO—, —OCO—, —O—COO—, —CO—$NR^1$—, —$NR^1$—CO—, —$NR^1$—CO—$NR^1$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_3$—, —$(CH_2)_4$—, —$CF_2CH_2$—, —$CF_2CH_2$—, —CH=CH—, —$CY^1$=$CY^2$—, —CH=N—, —N=CH—, —N=N—, —CH=$CR^1$—, —C≡C—, —CH=CH—COO—, —OCO—CH=CH—, or —$CR^1R^2$—. Here, said $Y^1$ and $Y^2$ are independently —H, —F, —Cl, —CN, or —$R^1$, and said $R^1$ and $R^2$ are independently —H or a $C_1$-$C_{12}$ alkyl.

$L^1$ and $L^2$ in Chemical Formula 1 are the ends of the mesogenic group and they are independently —H, —F, —Cl, —Br, —I, —CN, —NC, —NCO, —OCN, —SCN, —C(=O)$NR^1R^2$, —C(=O)$R^1$, —O—C(=O)$R^1$, —$NH_2$, —SH, —$SR^1$, —$SO_3H$, —$SO_2R^1$, —OH, —$NO_2$, —$CF_3$, —$SF_3$, a substituted or non-substituted silyl, a substituted or non-substituted $C_1$-$C_{40}$ carbyl or hydrocarbyl, or —$S_p$—P, wherein at least one of said $L^1$ and $L^2$ is —$S_p$—P. Here, said P is a polymerizable group, said $S_p$ is a spacer group or a single bond, and $R^1$ and $R^2$ are independently —H or a $C_1$-$C_{12}$ alkyl.

For a non-restrictive example, said $L^1$ and $L^2$ may be a $C_1$-$C_{25}$ linear, branched, or cyclic alkyl group that is non-substituted, mono-substituted, or multi-substituted with F, Cl, Br, I, or CN; and at this time, one or more non-adjacent $CH_2$ groups may be independently substituted with —O—, —S—, —NH—, —$NR^1$—, $SiR^1R^2$—, —CO—, —COO—, —OCO—, —OCO—O—, —S—CO—, —CO—S—, —$SO_2$—, —CO—$NR^1$—, —$NR^1$—CO—, —$NR^1$—CO—$NR^1$—, —$CY^1$=$CY^2$—, or —C≡C—. Here, said $Y^1$ and $Y^2$ are independently —H, —F, —Cl, —CN, or —$R^1$, and said $R^1$ and $R^2$ are independently —H or a $C_1$-$C_{12}$ alkyl.

Furthermore, said $L^1$ and $L^2$ may be selected from a $C_1$-$C_{20}$ alkyl, a $C_1$-$C_{20}$ oxaalkyl, a $C_1$-$C_{20}$ alkoxy, a $C_2$-$C_{20}$ alkenyl, a $C_2$-$C_{20}$ alkynyl, a $C_1$-$C_{20}$ silyl, a $C_1$-$C_{20}$ ester, a $C_1$-$C_{20}$ amino, and a $C_1$-$C_{20}$ fluoroalkyl.

In —$S_p$—P that is an example of said $L^1$ and $L^2$, said P is a polymerizable group, and it may preferably be $CH_2$=$CZ^1$—COO—, $CH_2$=$CZ^1$—CO—, $CH_2$=$CZ^2$—$(O)_a$—, $CH_3$—CH=CH—O—, $(CH_2$=CH$)_2$CH—OCO—, $(CH_2$=CH—$CH_2)_2$CH—OCO—, $(CH_2$=CH$)_2$CH—O—, $(CH_2$=CH—$CH_2)_2$N—, $(CH_2$=CH—$CH_2)_2$N—CO—, HO—$CZ^1Z^2$—, HS—$CZ^1Z^2$—, $HZ^1$N—, HO—$CZ^1Z^2$—NH—, $CH_2$=$CZ^1$—CO—NH—, $CH_2$=CH—$(COO)_a$-Phe-$(O)_b$—, $CH_2$=CH—$(CO)_a$-Phe-$(O)_b$—, Phe-CH=CH—, HOOC—, OCN—, $Z^1Z^2Z^3$Si—,

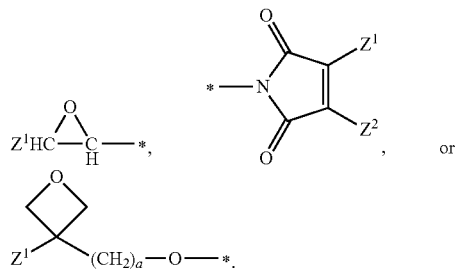

Here, said $Z^1$ to $Z^3$ are independently —H, —F, —Cl, —CN, —$CF_3$, phenyl, or a $C_1$-$C_5$ alkyl, said Phe is 1,4-phenylene that is non-substituted or substituted with —F, —Cl, —Br, —I, —CN, —NC, —NCO, —OCN, —SCN, —C(=O)$NR^1R^2$, —C(=O)$R^1$, —$NH_2$, —SH, —$SR^1$, —$SO_3H$, —$SO_2R^1$, —OH, —$NO_2$, —$CF_3$, or —$SF_3$, and said a and b are independently 0 or 1.

In —$S_p$—P that is an example of said $L^1$ and $L^2$, said $S_p$ is selected from Chemical Formula —X'—$S_p$'— that makes —$S_p$—P into —X'—$S_p$'—P. Said $S_p$' is a $C_1$-$C_{20}$ alkylene that is mono-substituted or multi-substituted with —F, —Cl, —Br, —I, or —CN, and one or more —$CH_2$— groups in said alkylene may be replaced by —O—, —S—, —NH—, —$NR^1$—, —$SiR^1R^2$—, —CO—, —COO—, —OCO—, —OCO—O—, —S—CO—, —CO—S—, —$NR^1$—CO—O—, —O—CO—$NR^1$—, —$NR^1$—CO—$NR^1$—, —CH=CH—, or —C≡C—. Further, said X' is —O—, —S—, —CO—, —COO—, —OCO—, —O—COO—, —CO—$NR^1$—, —$NR^1$—CO—, —$NR^1$—CO—$NR^1$—, —$OCH_2$—, —$CH_2O$—, —$SCH_2$—, —$CH_2S$—, —$OCF_2$—, —$CF_2O$—, —$SCF_2$—, —$SF_2O$—, —$CF_2CH_2$—, —$CF_2CF_2$—, —CH=N—, —N=CH—, —N=N—, —CH=$CR^1$—, —$CY^1$=$CY^2$—, —C≡C—, —CH=CH—COO—, —OCO—CH=CH—, or a single bond. Here, said $Y^1$ and $Y^2$ are independently —H, —F, —Cl, —CN, or —$R^1$, and said $R^1$ and $R^2$ are independently —H or a $C_1$-$C_{12}$ alkyl.

In addition, m and n in Chemical Formula 1 may independently be an integer of 1 to 5. Here, if said m or n is 2 or more, each repeating unit of -($D^1$-$G^1$)- or -($G^2$-$D^2$)- repeated twice or more may be same as or different from each other. For example, when m is 2, $D^1$ or $G^1$ included in each repeating unit of -($D^1$-$G^1$)-($D^1$-$G^1$)- may be same as or different from each other in the range disclosed above.

Meanwhile, according to the embodiment of the present invention, the polymerizable liquid crystal compound represented by Chemical Formula 1 has at least two functional groups making the intermolecular interaction possible in its molecule. Since the polymerizable liquid crystal compound includes the functional groups making the intermolecular interaction possible, it can show more improved orientation stability through the interaction with other molecules.

In order to realize this effect, it is preferable that two or more functional groups making the intermolecular interaction possible are introduced to the polymerizable liquid crystal compound. The kind of the functional group making the intermolecular interaction possible is not particularly limited, but it may preferably be —F, —Cl, —Br, —I, —CN, —NC, —NCO, —OCN, —SCN, —C(=O)NR$^1$R$^2$, —C(=O)R$^1$, —NH$_2$, —SH, —SR$^1$, —SO$_3$H, —SO$_2$R$^1$, —OH, —NO$_2$, —CF$_3$, —SF$_3$, a C$_2$-C$_6$ alkenyl group, a C$_2$-C$_6$ alkynyl group, a C$_2$-C$_4$ acyl group, a C$_2$-C$_6$ alkynylene group of which the end is connected with a C$_2$-C$_4$ acyl group, a C$_1$-C$_6$ alcohol group, or a C$_1$-C$_{12}$ alkoxy group. Here, said R$^1$ and R$^2$ are independently —H or a C$_1$-C$_{12}$ alkyl.

The position to which the functional group making the intermolecular interaction possible is introduced is not particularly limited, and it may vary according to the design of the polymerizable liquid crystal compound such as length of the same, the kinds of the functional groups composing the same, and so on. Preferably, two or more hydrogens connected to the sp$^2$-hybridized carbon and sp$^3$-hybridized carbon included in A, E$^1$, E$^2$, D$^1$, D$^2$, G$^1$, G$^2$, L$^1$, and L$^2$ in Chemical Formula 1 may be substituted by the functional group making the intermolecular interaction possible. More preferably, the functional group making the intermolecular interaction possible may be introduced to A and G$^1$, or A and G$^2$, or A, G$^1$, and G$^2$, in Chemical Formula 1.

For non-restrictive examples, the polymerizable liquid crystal compound of Chemical Formula 1 may be the compounds represented by RD-01 to RD-30 according to the after-mentioned examples. However, said polymerizable liquid crystal compound is not restricted to the compounds of RD-01 to RD-30, and it may be realized by various combinations in the above-mentioned range.

The polymerizable liquid crystal compound represented by Chemical Formula 1 may be synthesized by applying known reactions, and a more detailed synthesis method will be explained through examples.

II. Polymerizable Liquid Crystal Composition

According to another embodiment of the present invention, the polymerizable liquid crystal composition including the compound represented by Chemical Formula 1 is provided.

Said polymerizable liquid crystal composition may be a composition prepared by dissolving the compound represented by Chemical Formula 1 in a solvent in company with a polymerization initiator. Further, the compound represented by Chemical Formula 1 may be included in said composition solely or by combination of 2 kinds or more of the same.

Here, radical polymerization initiators conventional in the art to which the present invention pertains may be used as the polymerization initiator. The content of the polymerization initiator may be determined in a conventional range in which the polymerization reaction of the polymerizable liquid crystal compound can be effectively initiated. According to the embodiment of the present invention, said polymerization initiator may be included in the content of 10 wt % or less, preferably 0.5 to 8 wt %, based on the total weight of the composition.

Said solvent may be benzene, toluene, xylene, mesitylene, n-butylbenzene, diethylbenzene, tetralin, methoxybenzene, 1,2-dimethoxybenzene, ethylene glycol dimethylether, diethylene glycol dimethylether, acetone, methylethylketone, methylisobutylketone, cyclopentanone, cyclohexanone, ethyl acetate, methyl lactate, ethyl lactate, ethylene glycol monomethyletheracetate, propylene glycol monomethyletheracetate, propylene glycol monoethyletheracetate, γ-butyrolactone, 2-pyrrolidone, N-methyl-2-pyrrolidone, dimethylformamide, chloroform, dichloromethane, carbon tetrachloride, dichloroethane, trichloroethylene, tetrachloroethylene, chlorobenzene, t-butyl alcohol, diacetone alcohol, glycerin, monoacetin, ethylene glycol, triethylene glycol, hexylene glycol, ethylene glycol monomethylether, ethyl cellosolve, butyl cellosolve, or a mixture thereof. Among the solvents, the solvent of which the boiling point is 60 to 250° C. is favorable for forming a layer of uniform thickness and minimizing the solvent residue or the fall in orientation when the composition is coated.

The polymerizable liquid crystal composition may further include a sensitizer such as xanthone, thioxanthone, chlorothioxanthone, phenothiazine, anthracene, diphenylanthracene, and so on, selectively with necessity.

The polymerizable liquid crystal composition may further include a surfactant such as a quaternary ammonium salt, an alkylamine oxide, a polyamine derivative, a polyoxyethylene-polyoxypropylene condensate, sodium lauryl sulfate, ammonium lauryl sulfate, an alkyl-substituted aromatic sulfonate, an alkyl phosphate, a perfluoroalkyl sulfonate, and so on; a shelf-life stabilizer such as hydroquinone, a hydroquinone monoalkylether-based compound, a pyrogallol-based compound, a thiophenol-based compound, a 2-naphthylamine-based compound, a 2-hydroxynaphthalene-based compound, and so on; an antioxidant such as 2,6-di-t-butyl-p-cresol, triphenylphosphite, and so on; or a UV-absorbent such as a salicylate-based compound, a benzophenyl-based compound, a benzotriazole-based compound, a cyanoacrylate-based compound, a nickel complex salt-based compound, and so on, selectively with necessity.

Said polymerizable liquid crystal composition may further include atomized materials for controlling the optical anisotropy or improving the strength of the polymerized layer, selectively with necessity. Said atomized materials may be atomized inorganic materials such as hectorite, montmorillonite, kaolinite, ZnO, TiO$_2$, CeO$_2$, Al$_2$O$_3$, Fe$_2$O$_3$, ZrO$_2$, MgF$_2$, SiO$_2$, SrCO$_3$, Ba(OH)$_2$, Ca(OH)$_2$, Ga(OH)$_3$, Al(OH)$_3$, Mg(OH)$_2$, Zr(OH)$_4$, and so on; or atomized organic materials such as carbon nanotubes, fullerene, dendrimer, polyvinyl alcohol, polymethacrylate, polyimide, and so on.

Said polymerizable liquid crystal composition may further include an arbitrary liquid crystal compound in addition to the compound of Chemical Formula 1. Said arbitrary liquid crystal compound may or may not have a polymerizable property. Here, for example, said arbitrary liquid crystal compound may be a liquid crystal compound having an ethylenic unsaturated bond, a compound having an optical active group, a rod-type liquid crystal compound, and so on. Further, said arbitrary liquid crystal compounds may be included in a proper amount according to their structure, and it may be favorable for the achievement of the goal disclosed above to include the arbitrary liquid crystal so that the content of the compound of Chemical Formula 1 is 20 wt % or more, or 50 wt % or more, based on the weight of all liquid crystal compounds.

III. Optical Film

According to still another embodiment of the present invention, an optical film formed by using the polymerizable liquid crystal composition is provided.

Particularly, said optical film is formed by using the polymerizable liquid crystal compound disclosed above, and thus it can include a liquid crystal layer having high orientation stability.

Said optical film can be obtained by coating the polymerizable liquid crystal composition on a supporting substrate, aligning the liquid crystal compound in the polymerizable liquid crystal composition and then eliminating a solvent therefrom, and exposing the same to an energy ray for the polymerization.

Here, the supporting substrate is not particularly limited, but for preferable examples, a glass plate, a polyethylene terephthalate film, a polyimide film, a polyamide film, a polymethylmethacrylate film, a polystyrene film, a polyvinylchloride film, a polytetrafluoroethylene film, a cellulose-based film, a silicone film, and so on may be used. The supporting substrate on which a polyimide alignment layer or a polyvinyl alcohol alignment layer is formed may be preferably used.

Any known method can be used for coating the composition on the supporting substrate, and, for example, a roll coating method, a spin coating method, a bar coating method, a dip coating method, a spray coating method, and so on can be applied. The thickness of the layer formed by the composition may vary according to the use, and preferably, it may be selected in the range of 0.01 to 100 μm.

Meanwhile, for a non-restrictive example, as the method of aligning the liquid crystal compound, a method of carrying out pre-alignment treatment on the supporting substrate may be used. Said alignment treatment may be carried out by forming a liquid crystal alignment layer including various polyimide alignment layers or polyvinyl alcohol-based alignment layers on the supporting substrate, and carrying out a treatment such as rubbing. Furthermore, a method of applying a magnetic field or an electric field to the composition on the supporting substrate may be used.

The method of polymerizing the polymerizable liquid crystal composition may be a known method of using light, heat, or electromagnetic waves.

The optical film may be used for retardation films, polarization devices, anti-reflection films, selective radiation layers, view angle compensation layers, and so on of a liquid crystal display or an OLED display. Particularly, when the optical film formed by using the composition is applied to an OLED display, the interference by external light can be minimized and it is possible to realize more perfect black.

Advantageous Effects

The polymerizable liquid crystal compound according to the present invention has at least two functional groups making the intermolecular interaction possible in its molecule, and thus it is possible to form a liquid crystal layer having high orientation stability by coating the composition including the same. Particularly, when the optical film formed by using the composition is applied to an OLED display, the interference by external light can be minimized and more perfect black can be realized.

DETAILED DESCRIPTION OF THE EMBODIMENTS

Hereinafter, functions and effects of the invention are explained in more detail through concrete examples. However, these examples are only for better understanding of the present invention, and the scope of the present invention is not limited to or by them.

Example 1

Synthesis of Compound RD-01

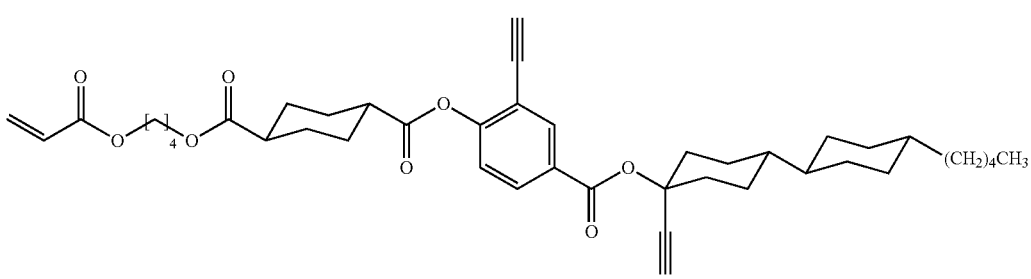

RD-01

Figure 1A:
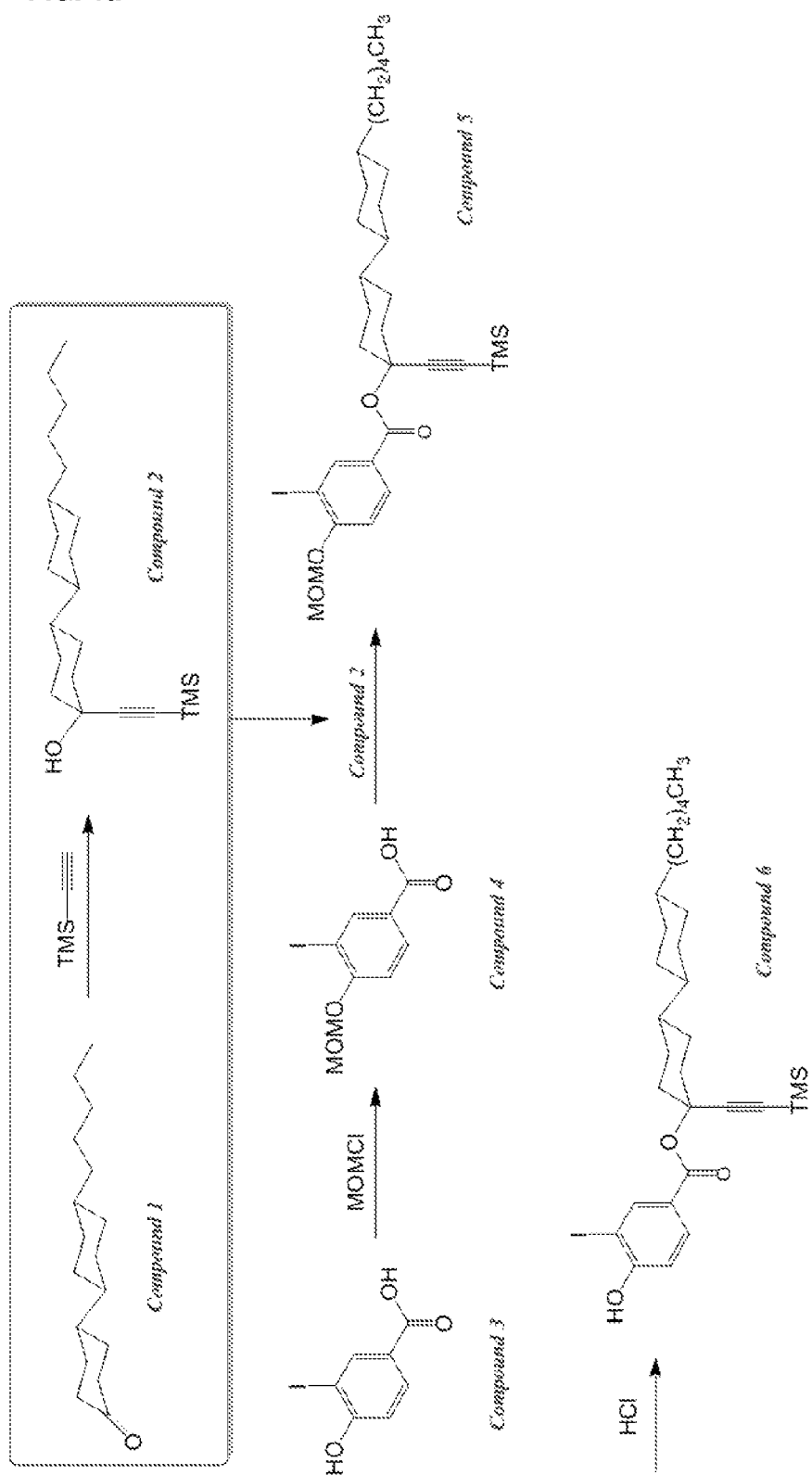
FIGS. 1a to 8b respectively illustrate the schemes of syntheses of the polymerizable liquid crystal compounds according to the embodiments of the present invention.
Figure 1B:
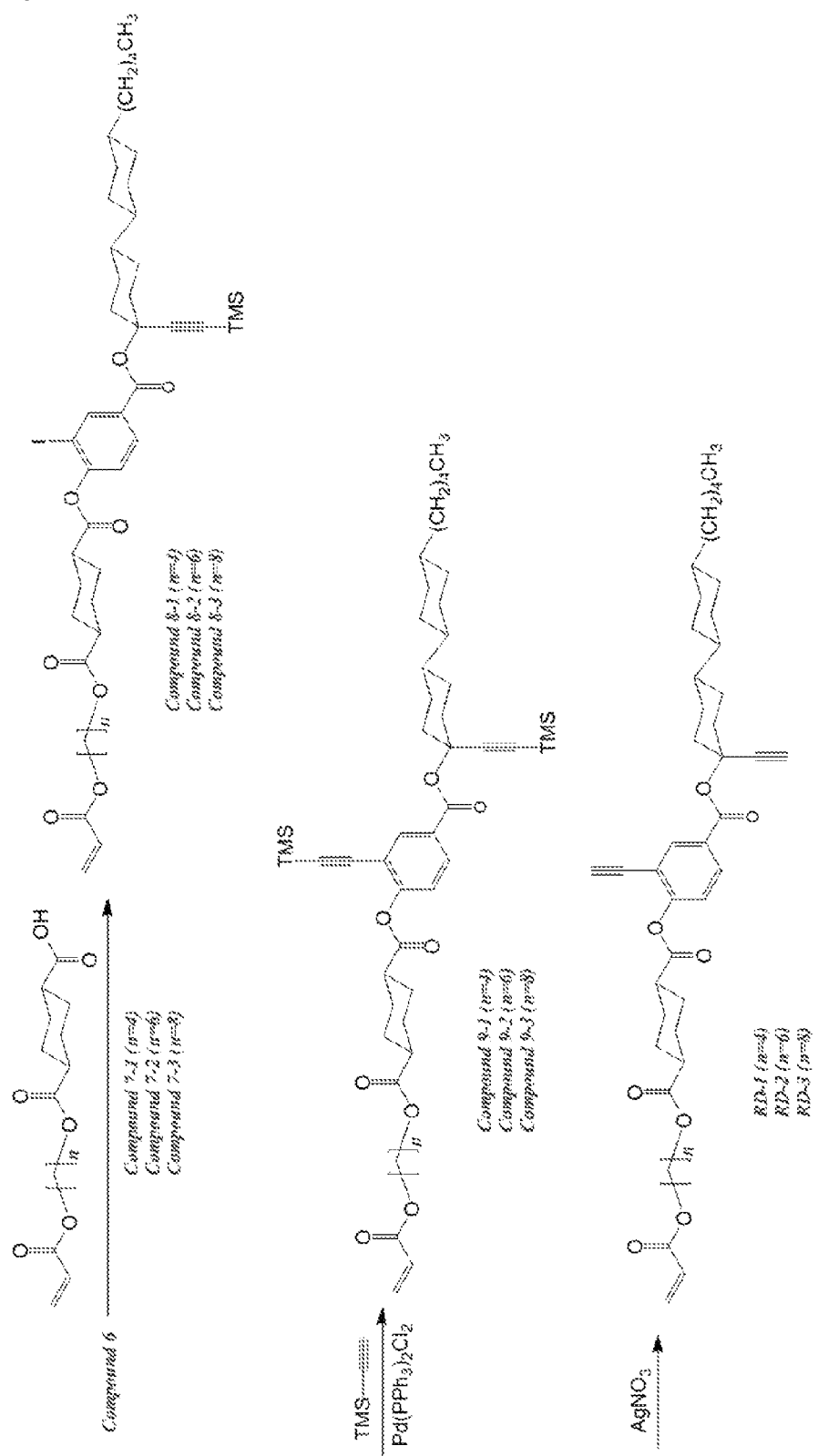

Compound RD-01 was synthesized according to the scheme shown in FIGS. 1a and 1b.

Synthesis of Compound 2

After dissolving about 100 g of Compound 1 ((1's,4'r)-4'-pentyl-[1,1'-bi(cyclohexane)]-4-one) and about 60 g of tetramethylenediamine in tetrahydrofuran, about 300 ml of n-butyl lithium was slowly added thereto dropwise at about −78° C. After stirring the mixture for about 2 h, ethynyltrimethylsilane was added thereto and the mixture was further stirred for about 1 h. Subsequently, about 120 g of Compound 2 was obtained by extracting the reacted product with dichloromethane and water, chemically drying the obtained organic layer, and refining the same with column chromatography.

Synthesis of Compound 4

After dissolving 100 g of Compound 3 (4-hydroxy-3-iodobenzoic acid) and about 400 g of N,N-diisopropylethylamine in dichloromethane, about 200 g of methylchloromethylether was slowly added thereto dropwise at about 0° C. After stirring the mixture for about 24 h, the product was washed with about 500 ml of ammonium chloride and extracted with dichloromethane and water. The extracted organic layer was chemically dried and the solvent was eliminated therefrom. The product obtained in this way and a potassium hydroxide aqueous solution were put in methanol and the solution was refluxed while stirring for about 3 h. The product was extracted by adding 6N hydrochloric acid thereto and then the solvent was eliminated therefrom by filtering the same. Then, about 110 g of Compound 4 was obtained by eliminating extra foreign substances therefrom by using hexane, and drying the same for about 48 h.

Synthesis of Compound 5

After dissolving about 100 g of Compound 4, about 100 g of Compound 2, and about 70 g of 4-(dimethylamino)pyridine in dichloromethane, the mixture was stirred for about 30 min. After adding about 80 g of 1-ethyl-3-(3-dimethylaminopropyl)carbodiimide thereto and stirring the same for about 24 h, the obtained product was extracted with dichloromethane and water. Then, about 150 g of Compound 5 was obtained by chemically drying the extracted organic layer and refining the same with column chromatography.

Synthesis of Compound 6

After dissolving about 100 g of Compound 5 and about 300 ml of 6N hydrochloric acid in tetrahydrofuran, the mixture was stirred for about 24 h at about 40° C. The reacted product was extracted with dichloromethane and water. Then, about 80 g of Compound 6 was obtained by chemically drying the extracted organic layer and refining the same with column chromatography.

Synthesis of Compound 8-1

After dissolving about 80 g of Compound 6, about 50 g of Compound 7-1 ((1r,4r)-4-((4-(acryloyloxy)butoxy)carbonyl)cyclohexanecarboxylic acid), about 5 g of 4-(dimethylamino)pyridine, and about 50 g of N,N-diisopropylethylamine in dichloromethane, the mixture was stirred for about 30 min. After adding about 80 g of 1-ethyl-3-(3-dimethylaminopropyl)carbodiimide and about 50 g of ethynyltrimethylsilane thereto and stirring the same for about 24 h, the obtained product was extracted with dichloromethane and water. Then, about 100 g of Compound 8-1 was obtained by chemically drying the extracted organic layer and refining the same with column chromatography.

Synthesis of Compound 9-1

After dissolving about 80 g of Compound 8-1, about 20 g of ethynyltrimethylsilane, about 3 g of $Pd(PPh_3)_2Cl_2$ (bis(triphenylphosphine)palladium(II) dichloride), and about 5 g of CuI (copper iodide) in tetrahydrofuran, the solution was refluxed while stirring for about 24 h. The produced salt was filtered and eliminated therefrom and the obtained product was extracted with dichloromethane and water. About 70 g of Compound 9-1 was obtained by chemically drying the extracted organic layer and refining the same with column chromatography.

Synthesis of Compound RD-01

After dissolving about 70 g of Compound 9-1 and about 6 g of $AgNO_3$ (silver nitrate) in a solvent mixture (water:dichloromethane:ethanol=1:6:3) and stirring the same for about 24 h, the obtained product was extracted with dichloromethane and water. About 50 g of Compound RD-01 was obtained by chemically drying the extracted organic layer and refining the same with column chromatography.

The NMR spectrum of the obtained Compound RD-01 is as follows.

$^1$H NMR ($CDCl_3$, standard material TMS) δ(ppm): 8.40 (1H, s), 8.02 (1H, dd), 7.37 (1H, d), 6.27 (1H, d), 6.05 (1H, dd), 5.59 (1H, d), 4.13 (2H, t), 4.05 (1H, s), 3.97 (2H, t), 3.52 (1H, s), 1.60-1.12 (48H, m)

The structure of Compound RD-01 was observed with a polarization microscope and the phase transition temperature was measured. As a result, it was recognized that Compound RD-01 forms a nematic phase in the temperature range of about 25 to 88° C.

Example 2

Synthesis of Compound RD-02

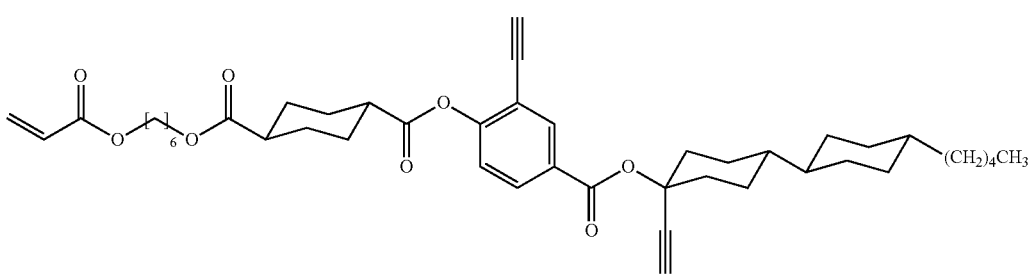

RD-02

Compound RD-02 was synthesized according to the scheme shown in FIGS. 1a and 1b.

Synthesis of Compound 8-2

About 100 g of Compound 8-2 was obtained by the same method as the synthesis of Compound 8-1 of Example 1, except that about 55 g of Compound 7-2 ((1r,4r)-4-(((6-(acryloyloxy)hexyl)oxy)carbonyl)cyclohexanecarboxylic acid) was used instead of Compound 7-1.

Synthesis of Compound 9-2

About 70 g of Compound 9-2 was obtained by the same method as the synthesis of Compound 9-1 of Example 1, except that Compound 8-2 was used instead of Compound 8-1.

Synthesis of Compound RD-02

About 50 g of Compound RD-02 was obtained by the same method as the synthesis of Compound RD-01 of Example 1, except that Compound 9-2 was used instead of Compound 9-1.

The NMR spectrum of the obtained Compound RD-02 is as follows.

$^1$H NMR (CDCl$_3$, standard material TMS) δ(ppm): 8.40 (1H, s), 8.02 (1H, dd), 7.37 (1H, d), 6.27 (1H, d), 6.05 (1H, dd), 5.59 (1H, d), 4.13 (2H, t), 4.05 (1H, s), 3.97 (2H, t), 3.52 (1H, s), 1.60-1.12 (52H, m)

The structure of Compound RD-02 was observed with a polarization microscope and the phase transition temperature was measured. As a result, it was recognized that Compound RD-02 forms a nematic phase in the temperature range of about 25 to 85° C.

Example 3

Synthesis of Compound RD-03

Compound RD-03 was synthesized according to the scheme shown in FIGS. 1a and 1b.

Synthesis of Compound 8-3

About 100 g of Compound 8-3 was obtained by the same method as the synthesis of Compound 8-1 of Example 1, except that about 60 g of Compound 7-3 ((1r,4r)-4-(((8-(acryloyloxy)octyl)oxy)carbonyl)cyclohexanecarboxylic acid) was used instead of Compound 7-1.

Synthesis of Compound 9-3

About 70 g of Compound 9-3 was obtained by the same method as the synthesis of Compound 9-1 of Example 1, except that Compound 8-3 was used instead of Compound 8-1.

Synthesis of Compound RD-03

About 50 g of Compound RD-03 was obtained by the same method as the synthesis of Compound RD-01 of Example 1, except that Compound 9-3 was used instead of Compound 9-1.

The NMR spectrum of the obtained Compound RD-03 is as follows.

$^1$H NMR (CDCl$_3$, standard material TMS) δ(ppm): 8.40 (1H, s), 8.02 (1H, dd), 7.37 (1H, d), 6.27 (1H, d), 6.05 (1H, dd), 5.59 (1H, d), 4.13 (2H, t), 4.05 (1H, s), 3.97 (2H, t), 3.52 (1H, s), 1.60-1.12 (56H, m)

The structure of Compound RD-03 was observed with a polarization microscope and the phase transition temperature was measured. As a result, it was recognized that Compound RD-03 forms a nematic phase in the temperature range of about 25 to 80° C.

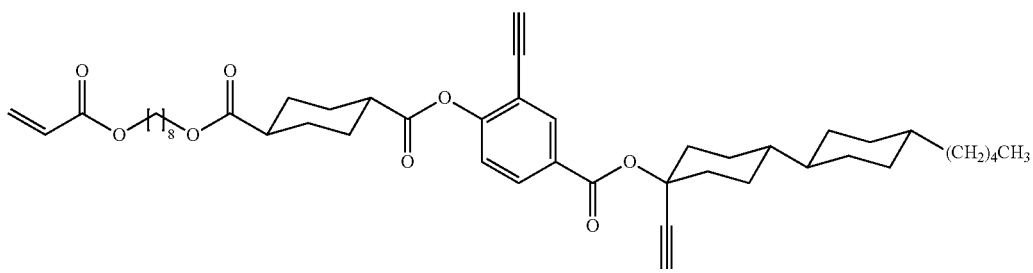

RD-03

Example 4

Synthesis of Compound RD-04

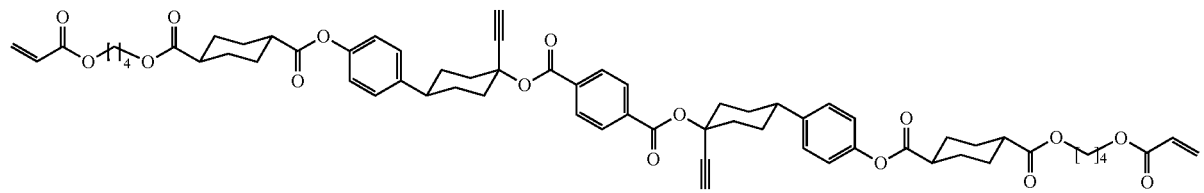

RD-04

Figure 2:
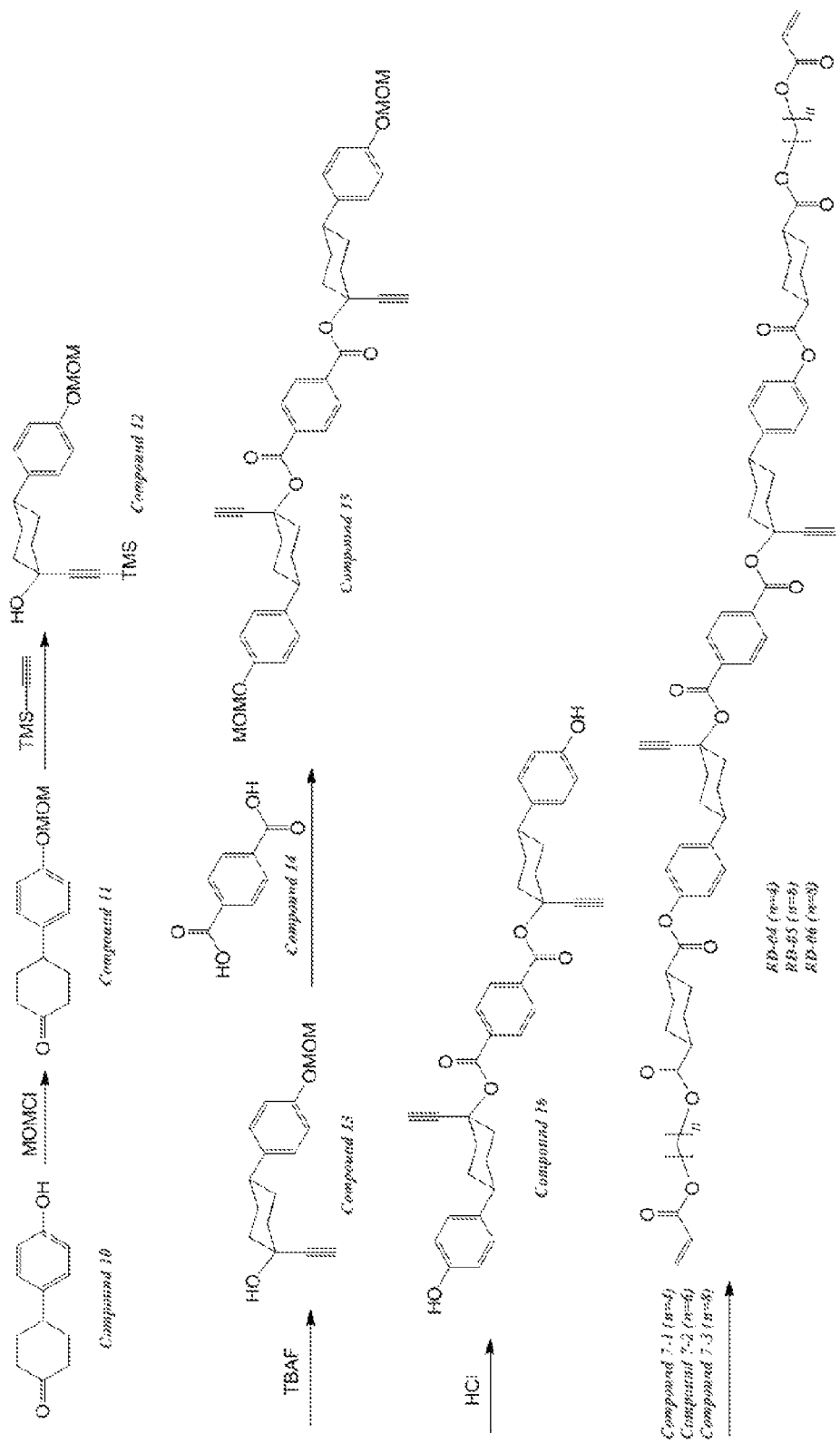

Compound RD-04 was synthesized according to the scheme shown in FIG. 2.

Synthesis of Compound 11

After dissolving about 100 g of Compound 10 (4-(4-hydroxyphenyl)cyclohexanone) and about 120 g of N,N-diisopropylethylamine in dichloromethane, about 50 g of methylchloromethylether was slowly added thereto dropwise. After stirring the mixture for about 2 h, the product was extracted with dichloromethane and water. Then, about 120 g of Compound 11 was obtained by chemically drying the extracted organic layer for eliminating the solvent therefrom, and refining the same with column chromatography.

Synthesis of Compound 12

After dissolving about 120 g of Compound 11 and about 100 g of N,N,N',N'-tetramethylethylenediamine in tetrahydrofuran, the mixture was stirred for about 20 min at about −78° C. About 500 ml of n-butyl lithium in 2.5M hexane was added thereto dropwise for about 2 h. After stirring the same for about 4 h, ethynyltrimethylsilane was added thereto and the mixture was further stirred for about 24 h. Then, the reacted product was extracted with ethylacetate and water, and about 100 g of Compound 12 was obtained by chemically drying the obtained organic layer, and refining the same with column chromatography.

Synthesis of Compound 13

After dissolving about 100 g of Compound 12 and about 10 g of tetrabutylammonium fluoride hydrate in tetrahydrofuran, the mixture was stirred for about 2 h. The reacted product was extracted with ethylacetate and water, and about 80 g of Compound 13 was obtained by chemically drying the extracted organic layer and refining the same with column chromatography.

Synthesis of Compound 15

After dissolving about 80 g of Compound 13, about 30 g of Compound 14 (terephthalic acid), and about 50 g of 4-(dimethylamino)pyridine in dichloromethane, the mixture was stirred for about 30 min. After adding about 80 g of 1-ethyl-3-(3-dimethylaminopropyl)carbodiimide thereto and stirring the same for about 24 h, the obtained product was extracted with dichloromethane and water. Then, about 80 g of Compound 15 was obtained by chemically drying the extracted organic layer and refining the same with column chromatography.

Synthesis of Compound 16

After dissolving about 100 g of Compound 15 and about 300 ml of 6N hydrochloric acid in tetrahydrofuran, the mixture was stirred for about 24 h at about 40° C. Then, the reacted product was extracted with dichloromethane and water, and about 60 g of Compound 16 was obtained by chemically drying the extracted organic layer and refining the same with column chromatography.

Synthesis of Compound RD-04

After dissolving about 80 g of Compound 16, about 80 g of Compound 7-1 ((1r,4r)-4-((4-(acryloyloxy)butoxy)carbonyl)cyclohexanecarboxylic acid), about 5 g of 4-(dimethylamino)pyridine, and about 50 g of N,N-diisopropylethylamine in dichloromethane, the mixture was stirred for about 30 min. After adding about 80 g of 1-ethyl-3-(3-dimethylaminopropyl)carbodiimide and about 50 g of ethynyltrimethylsilane thereto and stirring the same for about h, the obtained product was extracted with dichloromethane and water. Then, about 100 g of Compound RD-04 was obtained by chemically drying the extracted organic layer and refining the same with column chromatography.

The NMR spectrum of the obtained Compound RD-04 is as follows.

$^1$H NMR (CDCl$_3$, standard material TMS) δ(ppm): 7.85 (4H, s), 7.47 (4H, d), 7.21 (4H, d), 6.27 (2H, dd), 6.05 (2H, dd), 5.59 (2H, dd), 4.13 (4H, t), 3.97 (4H, t), 3.52 (2H, s), 2.50 (2H, t), 1.60-1.12 (44H, m)

The structure of Compound RD-04 was observed with a polarization microscope and the phase transition temperature was measured. As a result, it was recognized that Compound RD-04 forms a nematic phase in the temperature range of about 89 to 102° C.

Example 5

Synthesis of Compound RD-05

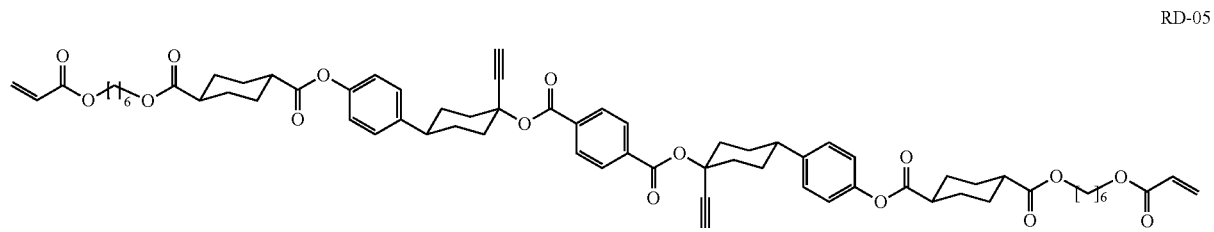

RD-05

Compound RD-05 was synthesized according to the scheme shown in FIG. 2.

Namely, about 100 g of Compound RD-05 was obtained by the same method as the synthesis of Compound RD-04 of Example 4, except that Compound 7-2 ((1r,4r)-4-(((6-(acryloyloxy)hexyl)oxy)carbonyl)cyclohexanecarboxylic acid) was used instead of Compound 7-1.

The NMR spectrum of the obtained Compound RD-05 is as follows.

$^1$H NMR (CDCl$_3$, standard material TMS) δ(ppm): 7.85 (4H, s), 7.47 (4H, d), 7.21 (4H, d), 6.27 (2H, dd), 6.05 (2H, dd), 5.59 (2H, dd), 4.13 (4H, t), 3.97 (4H, t), 3.52 (2H, s), 2.50 (2H, t), 1.60-1.12 (52H, m)

The structure of Compound RD-05 was observed with a polarization microscope and the phase transition temperature was measured. As a result, it was recognized that Compound RD-05 forms a nematic phase in the temperature range of about 81 to 95° C.

Example 6

Synthesis of Compound RD-06

Compound RD-06 was synthesized according to the scheme shown in FIG. 2.

Namely, about 100 g of Compound RD-06 was obtained by the same method as the synthesis of Compound RD-04 of Example 4, except that Compound 7-3 ((1r,4r)-4-(((8-(acryloyloxy)octyl)oxy)carbonyl)cyclohexanecarboxylic acid) was used instead of Compound 7-1.

The NMR spectrum of the obtained Compound RD-06 is as follows.

$^1$H NMR (CDCl$_3$, standard material TMS) δ(ppm): 7.85 (4H, s), 7.47 (4H, d), 7.21 (4H, d), 6.27 (2H, dd), 6.05 (2H, dd), 5.59 (2H, dd), 4.13 (4H, t), 3.97 (4H, t), 3.52 (2H, s), 2.50 (2H, t), 1.60-1.12 (60H, m)

The structure of Compound RD-06 was observed with a polarization microscope and the phase transition temperature was measured. As a result, it was recognized that Compound RD-06 forms a nematic phase in the temperature range of about 78 to 90° C.

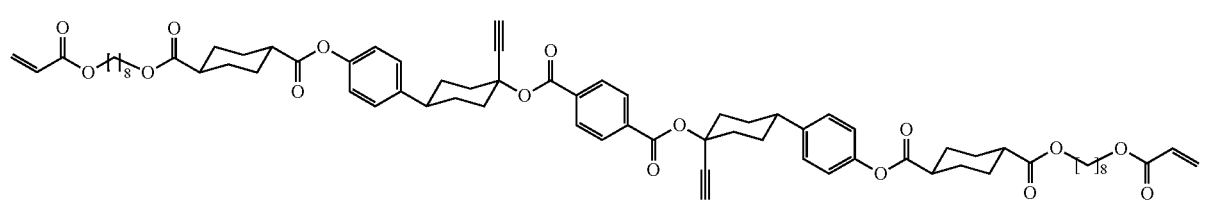

RD-06

Example 7

Synthesis of Compound RD-07

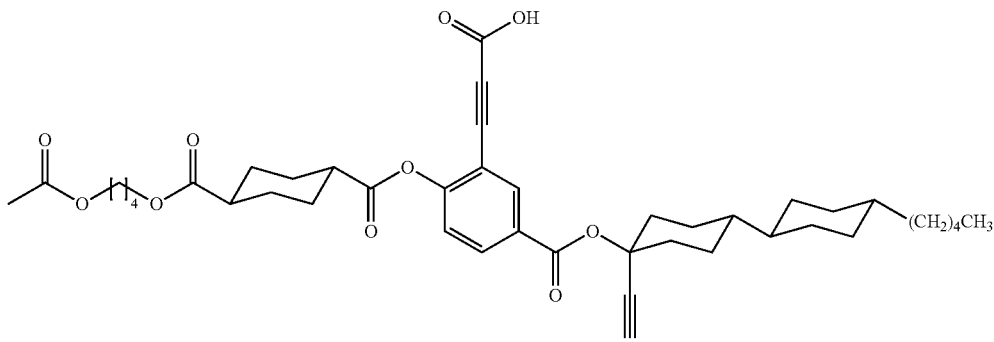

RD-07

Figure 3:
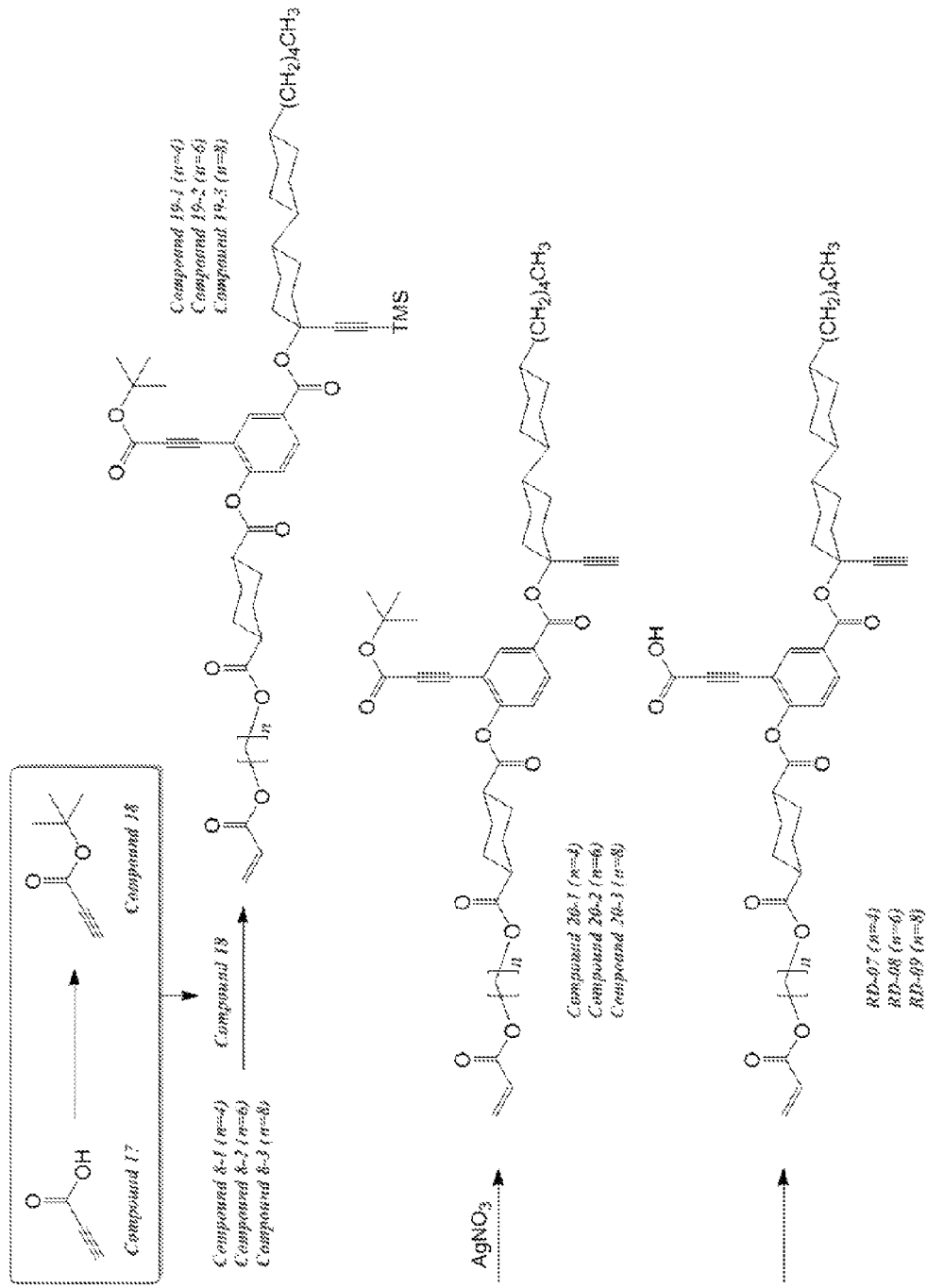

Compound RD-07 was synthesized according to the scheme shown in FIG. 3.

Synthesis of Compound 18

After dissolving about 60 g of Compound 17 (propiolic acid), about 100 g of N,N'-dicyclohexylcarbodiimide, about 10 g of 4-(dimethylamino)pyridine, and about 20 g of tert-butanol in tetrahydrofuran, the mixture was stirred for about 24 h. Then, the reacted product was extracted with dichloromethane and water, and about 80 g of Compound 18 was obtained by chemically drying the extracted organic layer and refining the same with column chromatography.

Synthesis of Compound 19-1

After dissolving about 80 g of Compound 8-1 according to Example 1, about 40 g of Compound 18, about 3 g of Pd(PPh$_3$)$_2$Cl$_2$ (bis(triphenylphosphine)palladium(II) dichloride), and about 5 g of CuI (copper iodide) in tetrahydrofuran, the solution was refluxed while stirring for about 24 h. The produced salt was filtered and eliminated therefrom and the obtained product was extracted with dichloromethane and water. About 70 g of Compound 19-1 was obtained by chemically drying the extracted organic layer and refining the same with column chromatography.

Synthesis of Compound 20-1

After dissolving about 70 g of Compound 19-1 and about 6 g of AgNO$_3$ (silver nitrate) in a solvent mixture (water:dichloromethane:ethanol=1:6:3) and stirring the same for about 24 h, the obtained product was extracted with dichloromethane and water. About 50 g of Compound 20-1 was obtained by chemically drying the extracted organic layer and refining the same with column chromatography.

Synthesis of Compound RD-07

After dissolving about 50 g of Compound 20-1 and about 50 g of tetrafluoroacetic acid in dichloromethane, the mixture was stirred for about 24 h. Then, the reacted product was extracted with dichloromethane and water, and about 40 g of Compound RD-07 was obtained by chemically drying the extracted organic layer and refining the same with column chromatography.

The NMR spectrum of the obtained Compound RD-07 is as follows.

$^1$H NMR (CDCl$_3$, standard material TMS) δ(ppm): 11.0 (1H, s), 8.40 (1H, s), 8.02 (1H, dd), 7.37 (1H, d), 6.27 (1H, d), 6.05 (1H, dd), 5.59 (1H, d), 4.13 (2H, t), 3.97 (2H, t), 3.52 (1H, s), 1.60-1.12 (48H, m)

The structure of Compound RD-07 was observed with a polarization microscope and the phase transition temperature was measured. As a result, it was recognized that Compound RD-07 forms a nematic phase in the temperature range of about 70 to 81° C.

Example 8

Synthesis of Compound RD-08

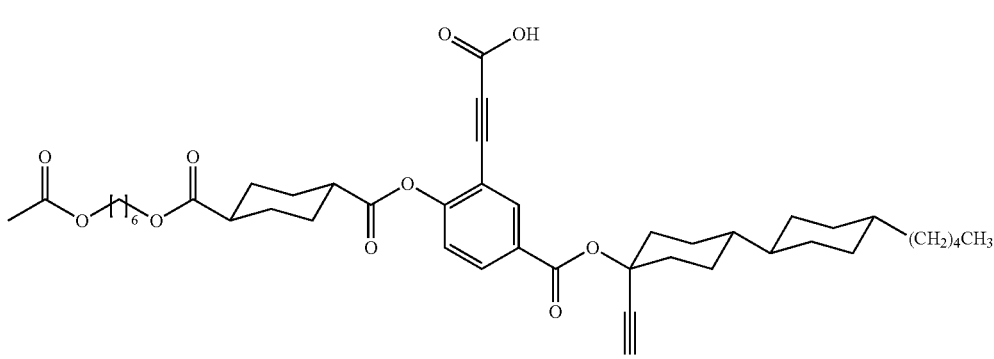

RD-08

Compound RD-08 was synthesized according to the scheme shown in FIG. 3.

Synthesis of Compound 19-2

About 70 g of Compound 19-2 was obtained by the same method as the synthesis of Compound 19-1 of Example 7, except that Compound 8-2 according to Example 2 was used instead of Compound 8-1.

Synthesis of Compound 20-2

About 70 g of Compound 20-2 was obtained by the same method as the synthesis of Compound 20-1 of Example 7, except that Compound 19-2 was used instead of Compound 19-1.

Synthesis of Compound RD-08

About 50 g of Compound RD-08 was obtained by the same method as the synthesis of Compound RD-07 of Example 7, except that Compound 20-2 was used instead of Compound 20-1.

The NMR spectrum of the obtained Compound RD-08 is as follows.

$^1$H NMR (CDCl$_3$, standard material TMS) δ(ppm): 11.0 (1H, s), 8.40 (1H, s), 8.02 (1H, dd), 7.37 (1H, d), 6.27 (1H, d), 6.05 (1H, dd), 5.59 (1H, d), 4.13 (2H, t), 3.97 (2H, t), 3.52 (1H, s), 1.60-1.12 (52H, m)

The structure of Compound RD-08 was observed with a polarization microscope and the phase transition temperature was measured. As a result, it was recognized that Compound RD-08 forms a nematic phase in the temperature range of about 68 to 78° C.

Example 9

Synthesis of Compound RD-09

Compound RD-09 was synthesized according to the scheme shown in FIG. 3.

Synthesis of Compound 19-3

About 70 g of Compound 19-3 was obtained by the same method as the synthesis of Compound 19-1 of Example 7, except that Compound 8-3 according to Example 3 was used instead of Compound 8-1.

Synthesis of Compound 20-3

About 70 g of Compound 20-3 was obtained by the same method as the synthesis of Compound 20-1 of Example 7, except that Compound 19-3 was used instead of Compound 19-1.

Synthesis of Compound RD-09

About 50 g of Compound RD-09 was obtained by the same method as the synthesis of Compound RD-07 of Example 7, except that Compound 20-3 was used instead of Compound 20-1.

The NMR spectrum of the obtained Compound RD-09 is as follows.

$^1$H NMR (CDCl$_3$, standard material TMS) δ(ppm): 11.0 (1H, s), 8.40 (1H, s), 8.02 (1H, dd), 7.37 (1H, d), 6.27 (1H, d), 6.05 (1H, dd), 5.59 (1H, d), 4.13 (2H, t), 3.97 (2H, t), 3.52 (1H, s), 1.60-1.12 (56H, m)

The structure of Compound RD-09 was observed with a polarization microscope and the phase transition temperature was measured. As a result, it was recognized that Compound RD-09 forms a nematic phase in the temperature range of about 65 to 77° C.

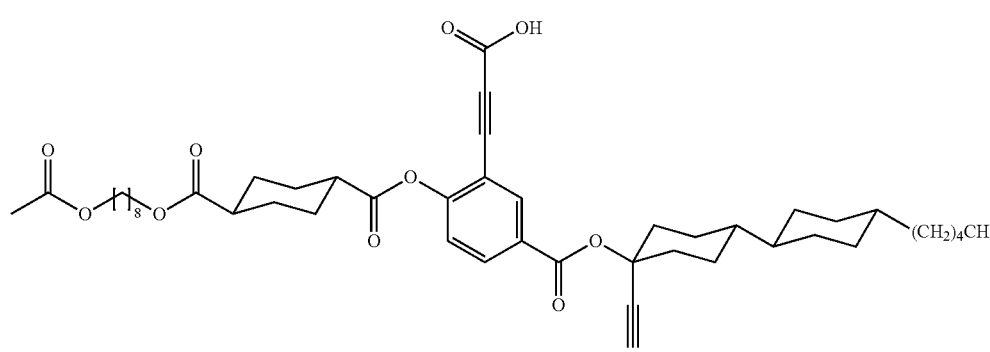

Example 10

Synthesis of Compound RD-10

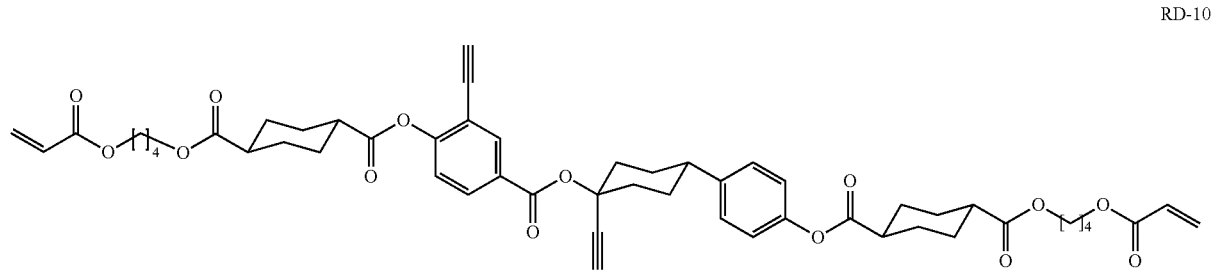

RD-10

Figure 4:
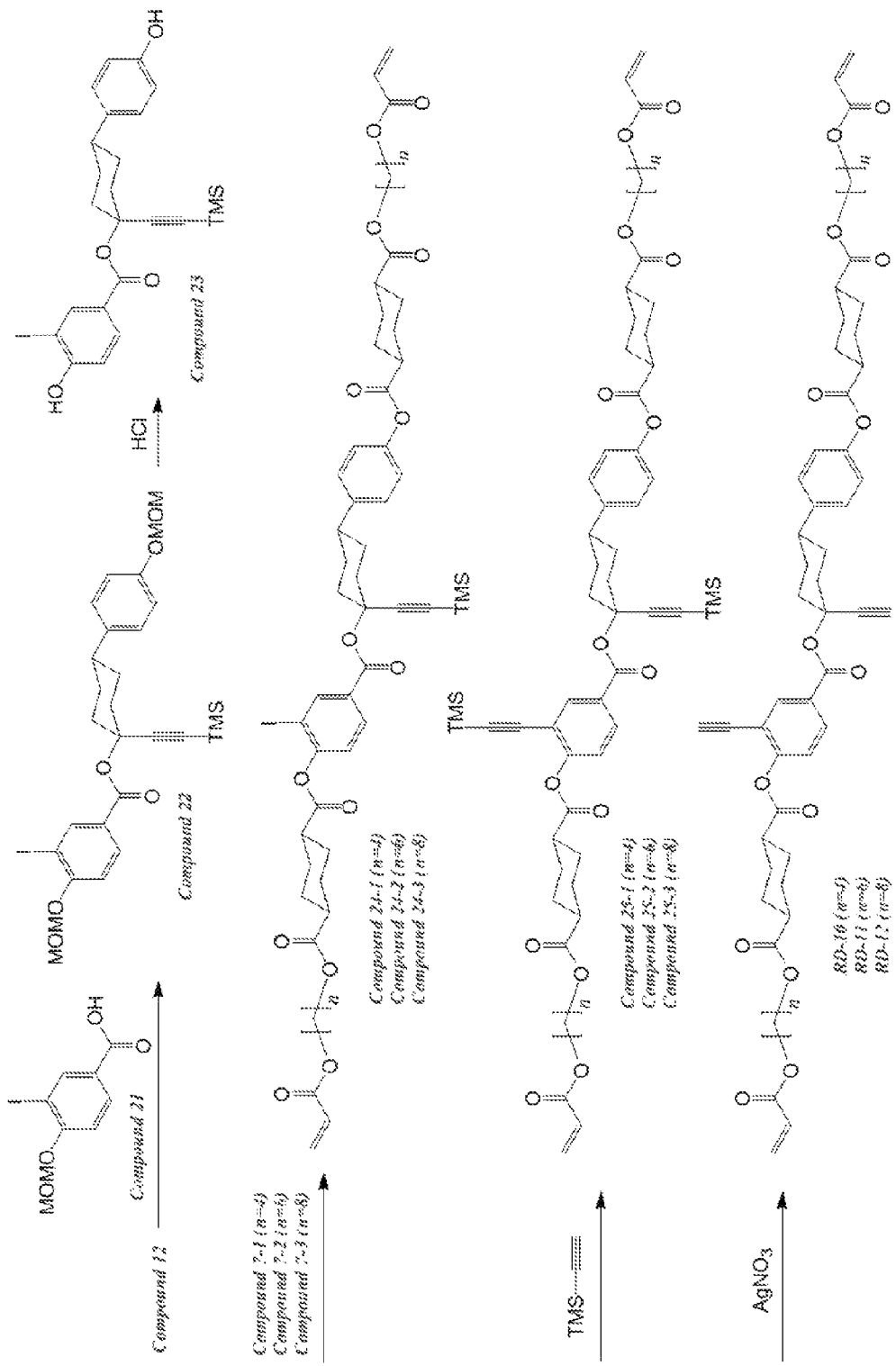

Compound RD-10 was synthesized according to the scheme shown in FIG. 4.

Synthesis of Compound 22

After dissolving about 70 g of Compound 12 according to Example 4, about 90 g of Compound 21 (3-iodo-4-(methoxymethoxy)benzoic acid), and about 50 g of 4-(dimethylamino)pyridine in dichloromethane, the mixture was stirred for about 30 min. After adding about 80 g of 1-ethyl-3-(3-dimethylaminopropyl)carbodiimide thereto and stirring the same for about 24 h, the obtained product was extracted with dichloromethane and water. Then, about 90 g of Compound 22 was obtained by chemically drying the extracted organic layer and refining the same with column chromatography.

Synthesis of Compound 23

After dissolving about 80 g of Compound 22 and about 300 ml of 6N hydrochloric acid in tetrahydrofuran, the mixture was stirred for about 24 h at about 40° C. Then, the reacted product was extracted with dichloromethane and water, and about 60 g of Compound 23 was obtained by chemically drying the extracted organic layer and refining the same with column chromatography.

Synthesis of Compound 24-1

About 80 g of Compound 24-1 was obtained by the same method as the synthesis of Compound 8-1 of Example 1, except that Compound 23 was used instead of Compound 6.

Synthesis of Compound 25-1

About 70 g of Compound 25-1 was obtained by the same method as the synthesis of Compound 9-1 of Example 1, except that Compound 24-1 was used instead of Compound 8-1.

Synthesis of Compound RD-10

About 30 g of Compound RD-10 was obtained by the same method as the synthesis of Compound RD-01 of Example 1, except that Compound 25-1 was used instead of Compound 9-1.

The NMR spectrum of the obtained Compound RD-10 is as follows.

$^1$H NMR (CDCl$_3$, standard material TMS) δ(ppm): 8.04 (1H, s), 8.02 (1H, d), 7.47 (2H, d), 7.37 (1H, d), 7.21 (2H, d), 6.27 (2H, dd), 6.05 (2H, dd), 5.59 (2H, dd), 4.13 (4H, t), 4.05 (1H, s), 3.97 (4H, t), 3.52 (1H, s), 2.50 (1H, t), 1.60-1.12 (23H, m)

The structure of Compound RD-10 was observed with a polarization microscope and the phase transition temperature was measured. As a result, it was recognized that Compound RD-10 forms a nematic phase in the temperature range of about 88 to 100° C.

Example 11

Synthesis of Compound RD-11

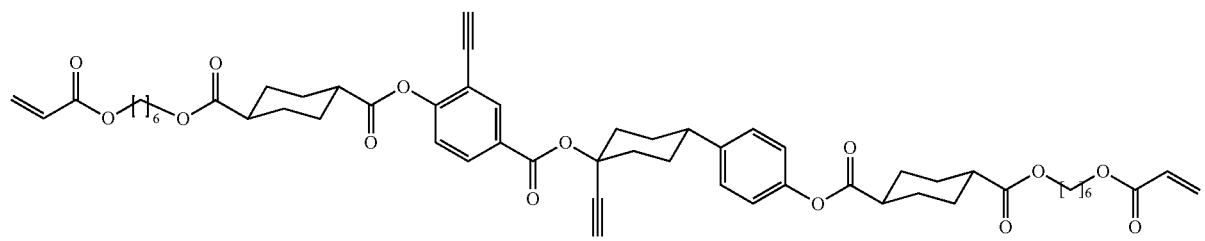

RD-11

Compound RD-11 was synthesized according to the scheme shown in FIG. 4.

Synthesis of Compound 24-2

About 100 g of Compound 24-2 was obtained by the same method as the synthesis of Compound 8-1 of Example 1, except that Compound 23 was used instead of Compound 6 and Compound 7-2 was used instead of Compound 7-1.

Synthesis of Compound 25-2

About 70 g of Compound 25-2 was obtained by the same method as the synthesis of Compound 9-1 of Example 1, except that Compound 24-2 was used instead of Compound 8-1.

Synthesis of Compound RD-11

About 50 g of Compound RD-11 was obtained by the same method as the synthesis of Compound RD-01 of Example 1, except that Compound 25-2 was used instead of Compound 9-1.

The NMR spectrum of the obtained Compound RD-11 is as follows.

$^1$H NMR (CDCl$_3$, standard material TMS) δ(ppm): 8.04 (1H, s), 8.02 (1H, d), 7.47 (2H, d), 7.37 (1H, d), 7.21 (2H, d), 6.27 (2H, dd), 6.05 (2H, dd), 5.59 (2H, dd), 4.13 (4H, t), 4.05 (1H, s), 3.97 (4H, t), 3.52 (1H, s), 2.50 (1H, t), 1.60-1.12 (31H, m)

The structure of Compound RD-11 was observed with a polarization microscope and the phase transition temperature was measured. As a result, it was recognized that Compound RD-11 forms a nematic phase in the temperature range of about 85 to 98° C.

Example 12

Synthesis of Compound RD-12

Compound RD-12 was synthesized according to the scheme shown in FIG. 4.

Synthesis of Compound 24-3

About 100 g of Compound 24-3 was obtained by the same method as the synthesis of Compound 8-1 of Example 1, except that Compound 23 was used instead of Compound 6 and Compound 7-3 was used instead of Compound 7-1.

Synthesis of Compound 25-3

About 70 g of Compound 25-3 was obtained by the same method as the synthesis of Compound 9-1 of Example 1, except that Compound 24-3 was used instead of Compound 8-1.

Synthesis of Compound RD-12

About 50 g of Compound RD-12 was obtained by the same method as the synthesis of Compound RD-01 of Example 1, except that Compound 25-3 was used instead of Compound 9-1.

The NMR spectrum of the obtained Compound RD-12 is as follows.

$^1$H NMR (CDCl$_3$, standard material TMS) δ(ppm): 8.04 (1H, s), 8.02 (1H, d), 7.47 (2H, d), 7.37 (1H, d), 7.21 (2H, d), 6.27 (2H, dd), 6.05 (2H, dd), 5.59 (2H, dd), 4.13 (4H, t), 4.05 (1H, s), 3.97 (4H, t), 3.52 (1H, s), 2.50 (1H, t), 1.60-1.12 (39H, m)

The structure of Compound RD-12 was observed with a polarization microscope and the phase transition tempera-

RD-12

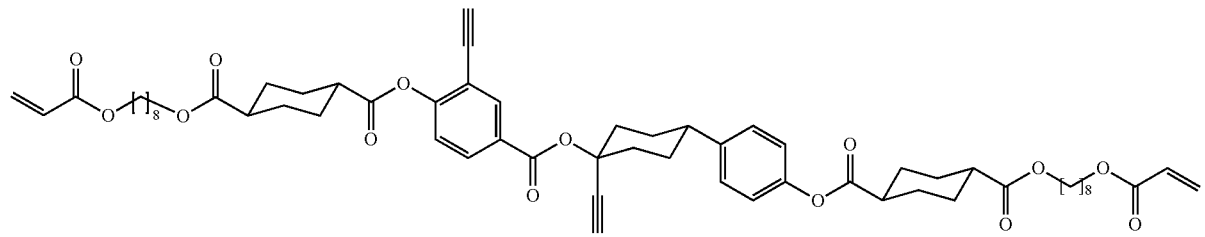

ture was measured. As a result, it was recognized that Compound RD-12 forms a nematic phase in the temperature range of about 78 to 95° C.

Example 13

Synthesis of Compound RD-13

RD-13

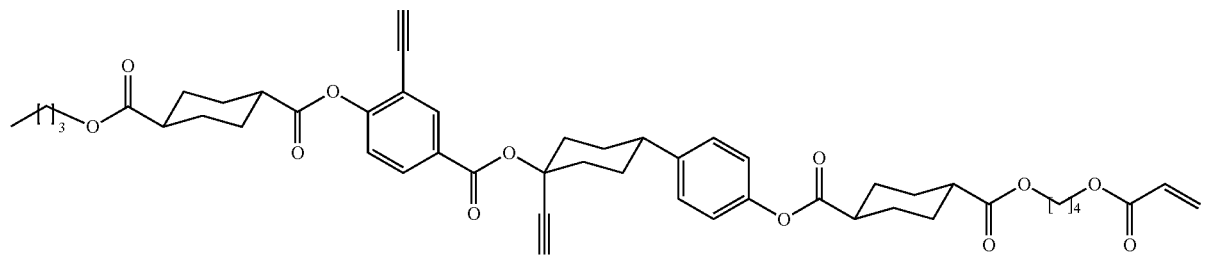

Figure 5A:
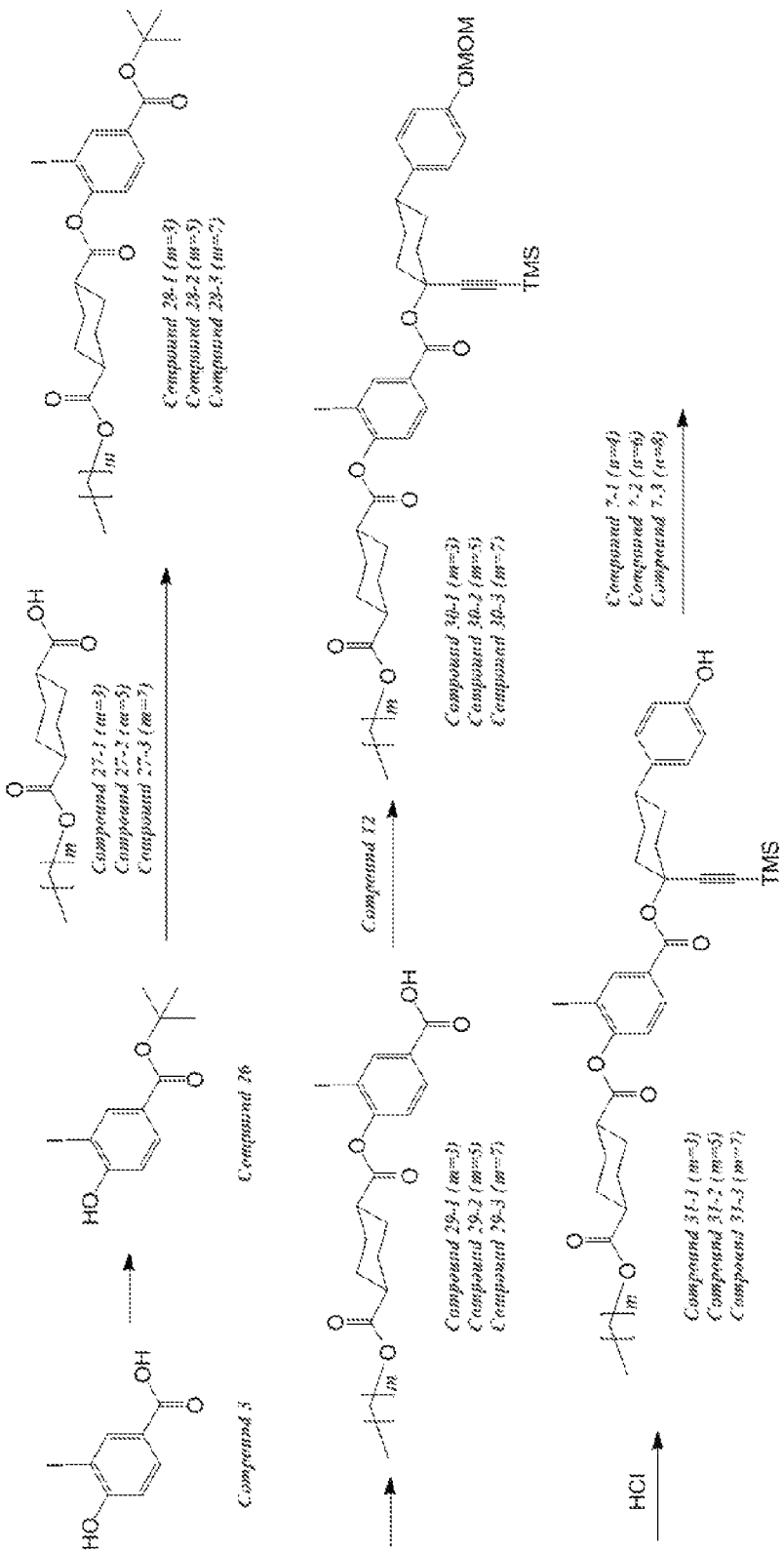
Figure 5B:
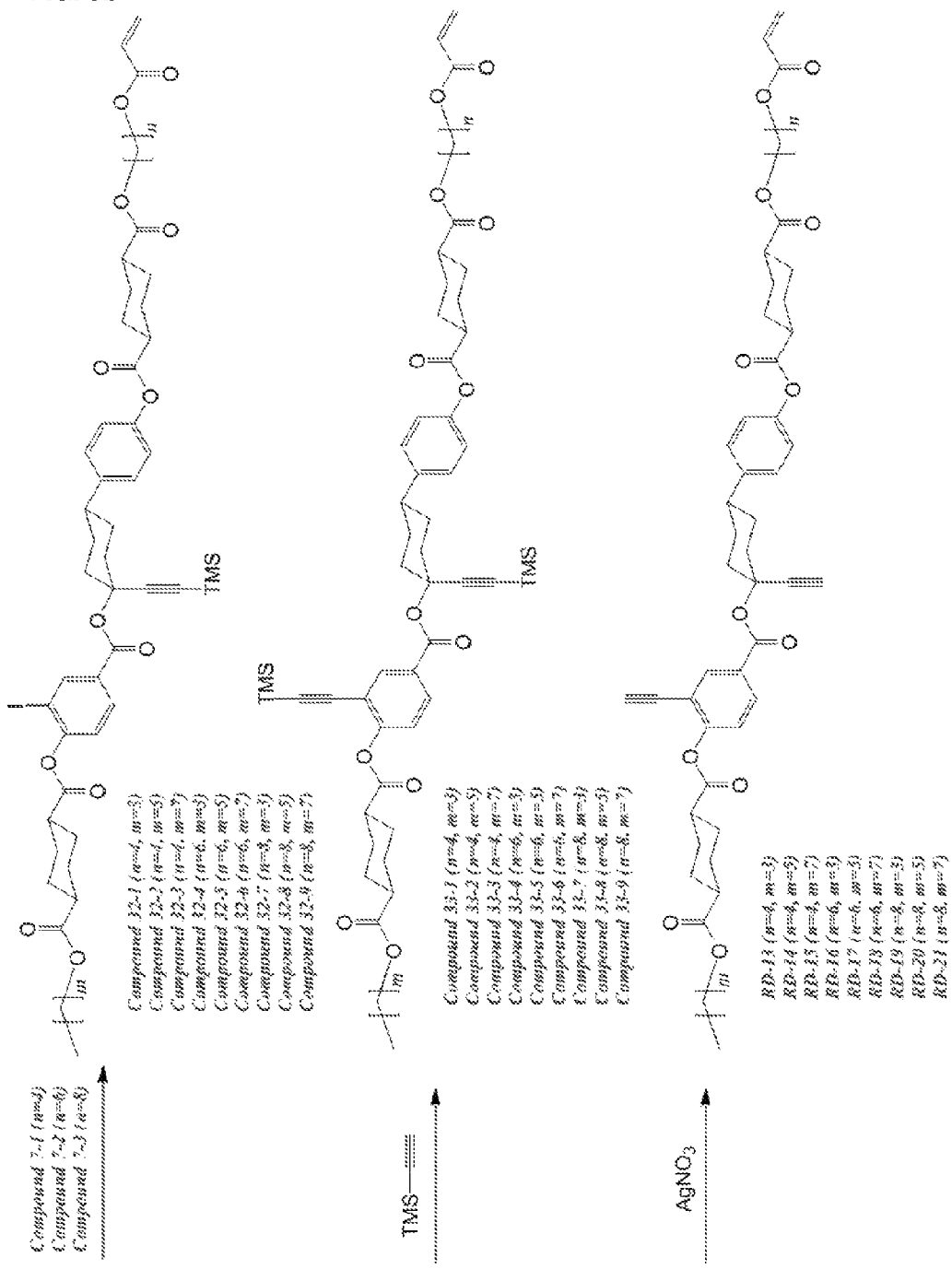

Compound RD-13 was synthesized according to the scheme shown in FIGS. 5a and 5b.

Synthesis of Compound 26

After dissolving about 100 g of Compound 3 (4-hydroxy-3-iodobenzoic acid), about 100 g of N,N'-dicyclohexylcarbodiimide, about 10 g of 4-(dimethylamino)pyridine, and about 20 g of tert-butanol in tetrahydrofuran, the mixture was stirred for about 24 h. Then, the reacted product was extracted with dichloromethane and water, and about 80 g of Compound 26 was obtained by chemically drying the extracted organic layer and refining the same with column chromatography.

Synthesis of Compound 28-1

After dissolving about 60 g of Compound 26, about 50 g of Compound 27-1 ((1r,4r)-4-(butoxycarbonyl)cyclohexanecarboxylic acid), about 5 g of 4-(dimethylamino)pyridine, and about 50 g of N,N-diisopropylethylamine in dichloromethane, the mixture was stirred for about 30 min. After adding about 80 g of 1-ethyl-3-(3-dimethylaminopropyl)carbodiimide and about 50 g of ethynyltrimethylsilane thereto and stirring the same for about 24 h, the obtained product was extracted with dichloromethane and water. Then, about 80 g of Compound 28-1 was obtained by chemically drying the extracted organic layer and refining the same with column chromatography.

Synthesis of Compound 29-1

After dissolving about 80 g of Compound 28-1 and about 50 g of tetrafluoroacetic acid in dichloromethane, the mixture was stirred for about 24 h. Then, the reacted product was extracted with dichloromethane and water, and about 60 g of Compound 29-1 was obtained by chemically drying the extracted organic layer and refining the same with column chromatography.

Synthesis of Compound 30-1

After dissolving about 60 g of Compound 29-1, about 50 g of Compound 12, and about 50 g of 4-(dimethylamino)pyridine in dichloromethane, the mixture was stirred for about 30 min. After adding about 80 g of 1-ethyl-3-(3-dimethylaminopropyl)carbodiimide thereto and stirring the same for about 24 h, the obtained product was extracted with dichloromethane and water. Then, about 80 g of Compound 30-1 was obtained by chemically drying the extracted organic layer and refining the same with column chromatography.

Synthesis of Compound 31-1

After dissolving about 80 g of Compound 30-1 and about 300 ml of 6N hydrochloric acid in tetrahydrofuran, the mixture was stirred for about 24 h at about 40° C. Then, the reacted product was extracted with dichloromethane and water, and about 60 g of Compound 31-1 (m=3) was obtained by chemically drying the extracted organic layer and refining the same with column chromatography.

Synthesis of Compound 32-1

About 80 g of Compound 32-1 was obtained by the same method as the synthesis of Compound 8-1 of Example 1, except that Compound 31-1 (m=3) was used instead of Compound 6.

Synthesis of Compound 33-1

About 70 g of Compound 33-1 was obtained by the same method as the synthesis of Compound 9-1 of Example 1, except that Compound 32-1 was used instead of Compound 8-1.

Synthesis of Compound RD-13

About 30 g of Compound RD-13 was obtained by the same method as the synthesis of Compound RD-01 of Example 1, except that Compound 33-1 was used instead of Compound 9-1.

The NMR spectrum of the obtained Compound RD-13 is as follows.

$^1$H NMR (CDCl$_3$, standard material TMS) δ(ppm): 8.04 (1H, s), 8.02 (1H, d), 7.47 (2H, d), 7.37 (1H, d), 7.21 (2H, d), 6.27 (2H, dd), 6.05 (1H, dd), 5.59 (1H, dd), 4.13 (4H, t), 4.05 (1H, s), 3.97 (2H, t), 3.52 (1H, s), 2.50 (1H, t), 1.60-0.90 (25H, m)

The structure of Compound RD-13 was observed with a polarization microscope and the phase transition temperature was measured. As a result, it was recognized that Compound RD-13 forms a nematic phase in the temperature range of about 78 to 90° C.

Example 14

Synthesis of Compound RD-14

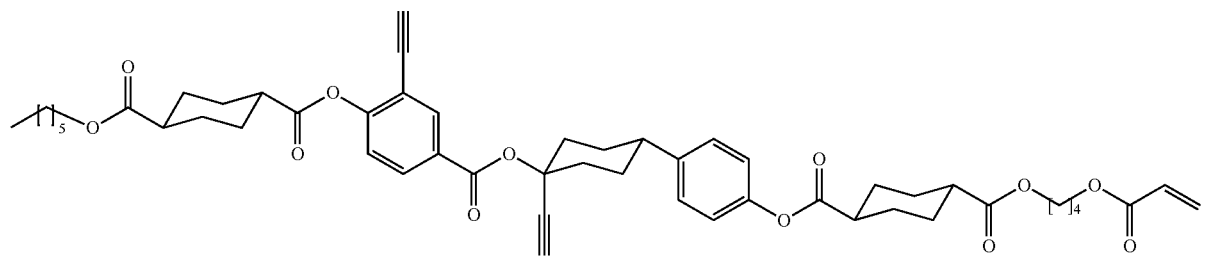

RD-14

Compound RD-14 was synthesized according to the scheme shown in FIGS. 5a and 5b.

Synthesis of Compound 28-2

About 100 g of Compound 28-2 was obtained by the same method as the synthesis of Compound 28-1 of Example 13, except that Compound 27-2 ((1r,4r)-4-((hexyloxy)carbonyl) cyclohexanecarboxylic acid) was used instead of Compound 27-1.

Synthesis of Compound 29-2

About 70 g of Compound 29-2 was obtained by the same method as the synthesis of Compound 29-1 of Example 13, except that Compound 28-2 was used instead of Compound 28-1.

Synthesis of Compound 30-2

About 90 g of Compound 30-2 was obtained by the same method as the synthesis of Compound 30-1 of Example 13, except that Compound 29-2 was used instead of Compound 29-1.

Synthesis of Compound 31-2

About 70 g of Compound 31-2 (m=5) was obtained by the same method as the synthesis of Compound 31-1 of Example 13, except that Compound 30-2 was used instead of Compound 30-1.

Synthesis of Compound 32-2

About 80 g of Compound 32-2 was obtained by the same method as the synthesis of Compound 8-1 of Example 1, except that Compound 31-2 (m=5) was used instead of Compound 6.

Synthesis of Compound 33-2

About 60 g of Compound 33-2 was obtained by the same method as the synthesis of Compound 9-1 of Example 1, except that Compound 32-2 was used instead of Compound 8-1.

Synthesis of Compound RD-14

About 50 g of Compound RD-14 was obtained by the same method as the synthesis of Compound RD-01 of Example 1, except that Compound 33-2 was used instead of Compound 9-1.

The NMR spectrum of the obtained Compound RD-14 is as follows.

$^1$H NMR (CDCl$_3$, standard material TMS) δ(ppm): 8.04 (1H, s), 8.02 (1H, d), 7.47 (2H, d), 7.37 (1H, d), 7.21 (2H, d), 6.27 (2H, dd), 6.05 (1H, dd), 5.59 (1H, dd), 4.13 (4H, t), 4.05 (1H, s), 3.97 (2H, t), 3.52 (1H, s), 2.50 (1H, t), 1.60-0.90 (29H, m)

The structure of Compound RD-14 was observed with a polarization microscope and the phase transition temperature was measured. As a result, it was recognized that Compound RD-14 forms a nematic phase in the temperature range of about 77 to 88° C.

Example 15

Synthesis of Compound RD-15

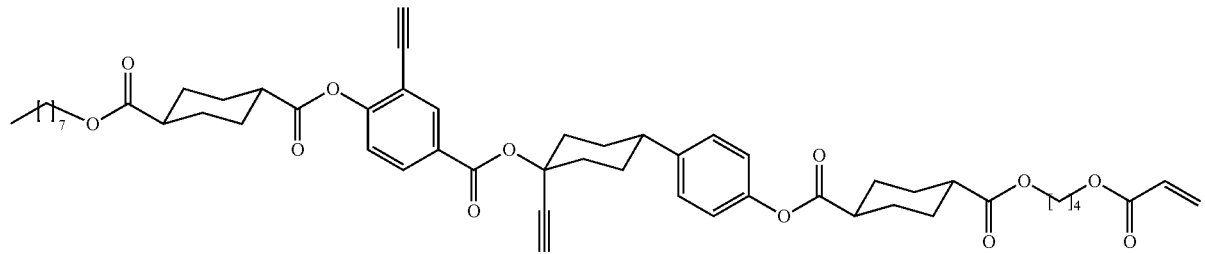

RD-15

Compound RD-15 was synthesized according to the scheme shown in FIGS. 5a and 5b.

Synthesis of Compound 28-3

About 100 g of Compound 28-3 was obtained by the same method as the synthesis of Compound 28-1 of Example 13, except that Compound 27-3 ((1r,4r)-4-((octyloxy)carbonyl)cyclohexanecarboxylic acid) was used instead of Compound 27-1.

Synthesis of Compound 29-3

About 70 g of Compound 29-3 was obtained by the same method as the synthesis of Compound 29-1 of Example 13, except that Compound 28-3 was used instead of Compound 28-1.

Synthesis of Compound 30-3

About 90 g of Compound 30-3 was obtained by the same method as the synthesis of Compound 30-1 of Example 13, except that Compound 29-3 was used instead of Compound 29-1.

Synthesis of Compound 31-3

About 70 g of Compound 31-3 (m=7) was obtained by the same method as the synthesis of Compound 31-1 of Example 13, except that Compound 30-3 was used instead of Compound 30-1.

Synthesis of Compound 32-3

About 80 g of Compound 32-3 was obtained by the same method as the synthesis of Compound 8-1 of Example 1, except that Compound 31-3 (m=7) was used instead of Compound 6.

Synthesis of Compound 33-3

About 60 g of Compound 33-3 was obtained by the same method as the synthesis of Compound 9-1 of Example 1, except that Compound 32-3 was used instead of Compound 8-1.

Synthesis of Compound RD-15

About 50 g of Compound RD-15 was obtained by the same method as the synthesis of Compound RD-01 of Example 1, except that Compound 33-3 was used instead of Compound 9-1.

The NMR spectrum of the obtained Compound RD-15 is as follows.

$^1$H NMR (CDCl$_3$, standard material TMS) δ(ppm): 8.04 (1H, s), 8.02 (1H, d), 7.47 (2H, d), 7.37 (1H, d), 7.21 (2H, d), 6.27 (2H, dd), 6.05 (1H, dd), 5.59 (1H, dd), 4.13 (4H, t), 4.05 (1H, s), 3.97 (2H, t), 3.52 (1H, s), 2.50 (1H, t), 1.60-0.90 (33H, m)

The structure of Compound RD-15 was observed with a polarization microscope and the phase transition temperature was measured. As a result, it was recognized that Compound RD-15 forms a nematic phase in the temperature range of about 75 to 87° C.

Example 16

Synthesis of Compound RD-16

RD-16

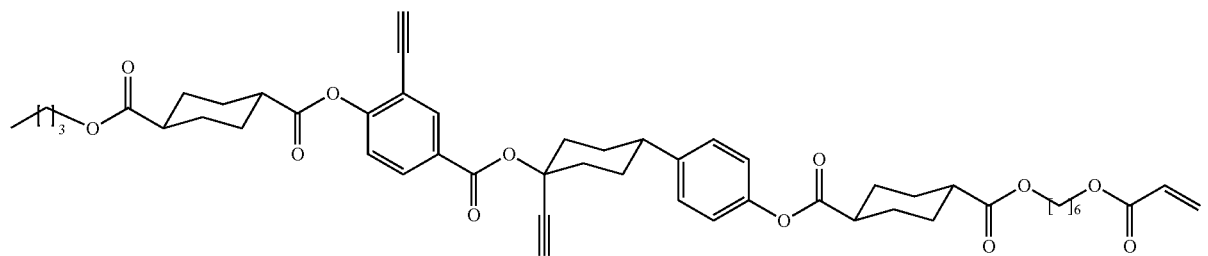

Compound RD-16 was synthesized according to the scheme shown in FIGS. 5a and 5b.

Synthesis of Compound 32-4

About 80 g of Compound 32-4 was obtained by the same method as the synthesis of Compound 8-1 of Example 1, except that Compound 31-1 (m=3) was used instead of Compound 6 and Compound 7-2 (n=6) ((1r,4r)-4-(((6-(acryloyloxy)hexyl)oxy)carbonyl)cyclohexanecarboxylic acid) was used instead of Compound 7-1.

Synthesis of Compound 33-4

About 60 g of Compound 33-4 was obtained by the same method as the synthesis of Compound 9-1 of Example 1, except that Compound 32-4 was used instead of Compound 8-1.

Synthesis of Compound RD-16

About 50 g of Compound RD-16 was obtained by the same method as the synthesis of Compound RD-01 of Example 1, except that Compound 33-4 was used instead of Compound 9-1.

The NMR spectrum of the obtained Compound RD-16 is as follows.

$^1$H NMR (CDCl$_3$, standard material TMS) δ(ppm): 8.04 (1H, s), 8.02 (1H, d), 7.47 (2H, d), 7.37 (1H, d), 7.21 (2H, d), 6.27 (1H, dd), 6.05 (1H, dd), 5.59 (1H, dd), 4.13 (4H, t), 4.05 (1H, s), 3.97 (2H, t), 3.52 (1H, s), 2.50 (1H, t), 1.60-0.90 (29H, m)

The structure of Compound RD-16 was observed with a polarization microscope and the phase transition tempera-

Example 17

Synthesis of Compound RD-17

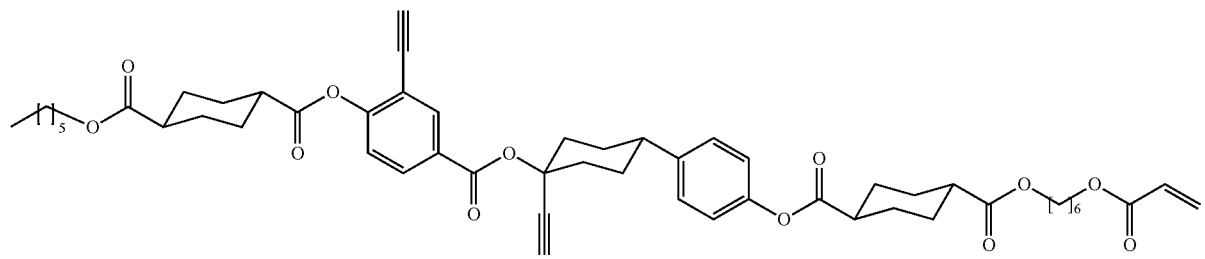

RD-17

Compound RD-17 was synthesized according to the scheme shown in FIGS. 5a and 5b.

Synthesis of Compound 32-5

About 80 g of Compound 32-5 was obtained by the same method as the synthesis of Compound 8-1 of Example 1, except that Compound 31-2 (m=5) was used instead of Compound 6 and Compound 7-2 (n=6) ((1r,4r)-4-(((6-(acryloyloxy)hexyl)oxy)carbonyl)cyclohexanecarboxylic acid) was used instead of Compound 7-1.

Synthesis of Compound 33-5

About 60 g of Compound 33-5 was obtained by the same method as the synthesis of Compound 9-1 of Example 1, except that Compound 32-5 was used instead of Compound 8-1.

Synthesis of Compound RD-17

About 50 g of Compound RD-17 was obtained by the same method as the synthesis of Compound RD-01 of Example 1, except that Compound 33-5 was used instead of Compound 9-1.

The NMR spectrum of the obtained Compound RD-17 is as follows.

$^1$H NMR (CDCl$_3$, standard material TMS) δ(ppm): 8.04 (1H, s), 8.02 (1H, d), 7.47 (2H, d), 7.37 (1H, d), 7.21 (2H, d), 6.27 (1H, dd), 6.05 (1H, dd), 5.59 (1H, dd), 4.13 (4H, t), 4.05 (1H, s), 3.97 (2H, t), 3.52 (1H, s), 2.50 (1H, t), 1.60-0.90 (33H, m)

The structure of Compound RD-17 was observed with a polarization microscope and the phase transition temperature was measured. As a result, it was recognized that Compound RD-17 forms a nematic phase in the temperature range of about 73 to 87° C.

Example 18

Synthesis of Compound RD-18

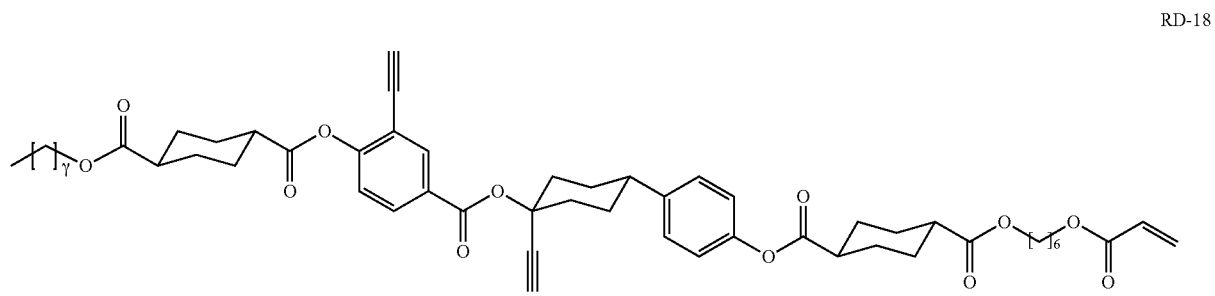

RD-18

Compound RD-18 was synthesized according to the scheme shown in FIGS. 5a and 5b.

Synthesis of Compound 32-6

About 80 g of Compound 32-6 was obtained by the same method as the synthesis of Compound 8-1 of Example 1, except that Compound 31-3 (m=7) was used instead of Compound 6 and Compound 7-2 (n=6) ((1r,4r)-4-(((6-(acryloyloxy)hexyl)oxy)carbonyl)cyclohexanecarboxylic acid) was used instead of Compound 7-1.

Synthesis of Compound 33-6

About 60 g of Compound 33-6 was obtained by the same method as the synthesis of Compound 9-1 of Example 1, except that Compound 32-6 was used instead of Compound 8-1.

Synthesis of Compound RD-18

About 50 g of Compound RD-18 was obtained by the same method as the synthesis of Compound RD-01 of Example 1, except that Compound 33-6 was used instead of Compound 9-1.

The NMR spectrum of the obtained Compound RD-18 is as follows.

$^1$H NMR (CDCl$_3$, standard material TMS) δ(ppm): 8.04 (1H, s), 8.02 (1H, d), 7.47 (2H, d), 7.37 (1H, d), 7.21 (2H, d), 6.27 (1H, dd), 6.05 (1H, dd), 5.59 (1H, dd), 4.13 (4H, t), 4.05 (1H, s), 3.97 (2H, t), 3.52 (1H, s), 2.50 (1H, t), 1.60-0.90 (37H, m)

The structure of Compound RD-18 was observed with a polarization microscope and the phase transition temperature was measured. As a result, it was recognized that Compound RD-18 forms a nematic phase in the temperature range of about 70 to 85° C.

Example 19

Synthesis of Compound RD-19

Synthesis of Compound 33-7

About 60 g of Compound 33-7 was obtained by the same method as the synthesis of Compound 9-1 of Example 1, except that Compound 32-7 was used instead of Compound 8-1.

Synthesis of Compound RD-19

About 50 g of Compound RD-19 was obtained by the same method as the synthesis of Compound RD-01 of Example 1, except that Compound 33-7 was used instead of Compound 9-1.

The NMR spectrum of the obtained Compound RD-19 is as follows.

$^1$H NMR (CDCl$_3$, standard material TMS) δ(ppm): 8.04 (1H, s), 8.02 (1H, d), 7.47 (2H, d), 7.37 (1H, d), 7.21 (2H, d), 6.27 (1H, dd), 6.05 (1H, dd), 5.59 (1H, dd), 4.13 (4H, t), 4.05 (1H, s), 3.97 (2H, t), 3.52 (1H, s), 2.50 (1H, t), 1.60-0.90 (33H, m)

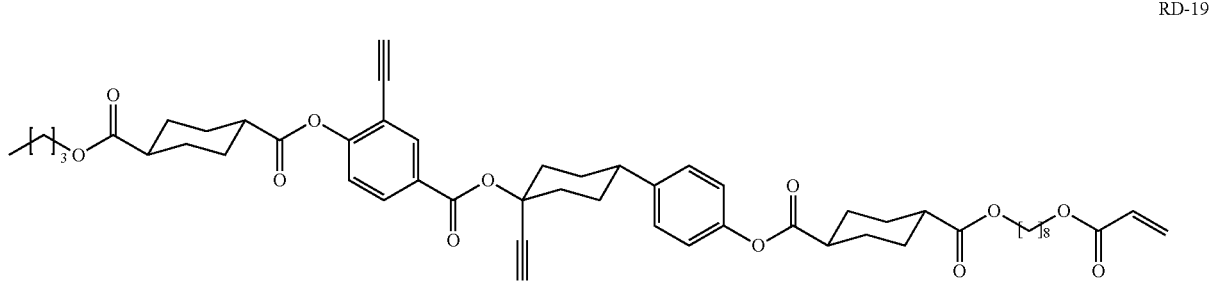

RD-19

Compound RD-19 was synthesized according to the scheme shown in FIGS. 5a and 5b.

Synthesis of Compound 32-7

About 80 g of Compound 32-7 was obtained by the same method as the synthesis of Compound 8-1 of Example 1, except that Compound 31-1 (m=3) was used instead of Compound 6 and Compound 7-3 (n=8) ((1r,4r)-4-(((8-(acryloyloxy)octyl)oxy)carbonyl)cyclohexanecarboxylic acid) was used instead of Compound 7-1.

The structure of Compound RD-19 was observed with a polarization microscope and the phase transition temperature was measured. As a result, it was recognized that Compound RD-19 forms a nematic phase in the temperature range of about 74 to 86° C.

Example 20

Synthesis of Compound RD-20

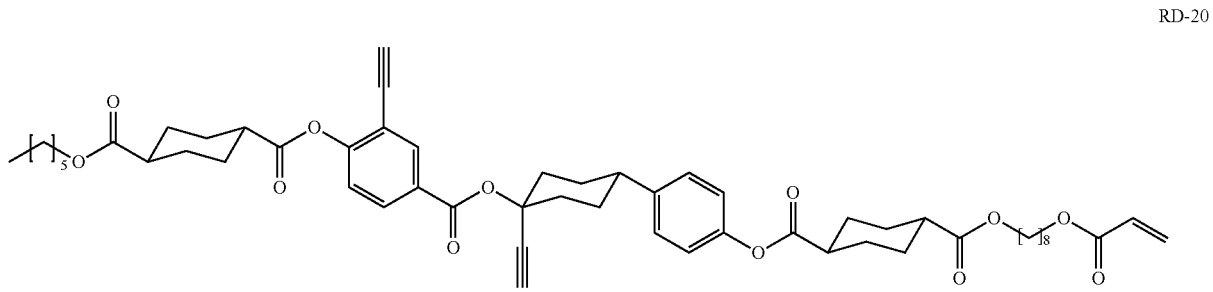

RD-20

Compound RD-20 was synthesized according to the scheme shown in FIGS. 5a and 5b.

Synthesis of Compound 32-8

About 80 g of Compound 32-8 was obtained by the same method as the synthesis of Compound 8-1 of Example 1, except that Compound 31-2 (m=5) was used instead of Compound 6 and Compound 7-3 (n=8) ((1r,4r)-4-(((8-(acryloyloxy)octyl)oxy)carbonyl)cyclohexanecarboxylic acid) was used instead of Compound 7-1.

Synthesis of Compound 33-8

About 60 g of Compound 33-8 was obtained by the same method as the synthesis of Compound 9-1 of Example 1, except that Compound 32-8 was used instead of Compound 8-1.

Synthesis of Compound RD-20

About 50 g of Compound RD-20 was obtained by the same method as the synthesis of Compound RD-01 of Example 1, except that Compound 33-8 was used instead of Compound 9-1.

The NMR spectrum of the obtained Compound RD-20 is as follows.

$^1$H NMR (CDCl$_3$, standard material TMS) δ(ppm): 8.04 (1H, s), 8.02 (1H, d), 7.47 (2H, d), 7.37 (1H, d), 7.21 (2H, d), 6.27 (1H, dd), 6.05 (1H, dd), 5.59 (1H, dd), 4.13 (4H, t), 4.05 (1H, s), 3.97 (2H, t), 3.52 (1H, s), 2.50 (1H, t), 1.60-0.90 (37H, m)

The structure of Compound RD-20 was observed with a polarization microscope and the phase transition temperature was measured. As a result, it was recognized that Compound RD-20 forms a nematic phase in the temperature range of about 72 to 84° C.

Example 21

Synthesis of Compound RD-21

Compound RD-21 was synthesized according to the scheme shown in FIGS. 5a and 5b.

Synthesis of Compound 32-9

About 80 g of Compound 32-9 was obtained by the same method as the synthesis of Compound 8-1 of Example 1, except that Compound 31-3 (m=7) was used instead of Compound 6 and Compound 7-3 (n=8) ((1r,4r)-4-(((8-(acryloyloxy)octyl)oxy)carbonyl)cyclohexanecarboxylic acid) was used instead of Compound 7-1.

Synthesis of Compound 33-9

About 60 g of Compound 33-9 was obtained by the same method as the synthesis of Compound 9-1 of Example 1, except that Compound 32-9 was used instead of Compound 8-1.

Synthesis of Compound RD-21

About 50 g of Compound RD-21 was obtained by the same method as the synthesis of Compound RD-01 of Example 1, except that Compound 33-9 was used instead of Compound 9-1.

The NMR spectrum of the obtained Compound RD-21 is as follows.

$^1$H NMR (CDCl$_3$, standard material TMS) δ(ppm): 8.04 (1H, s), 8.02 (1H, d), 7.47 (2H, d), 7.37 (1H, d), 7.21 (2H, d), 6.27 (1H, dd), 6.05 (1H, dd), 5.59 (1H, dd), 4.13 (4H, t), 4.05 (1H, s), 3.97 (2H, t), 3.52 (1H, s), 2.50 (1H, t), 1.60-0.90 (41H, m)

The structure of Compound RD-21 was observed with a polarization microscope and the phase transition temperature was measured. As a result, it was recognized that Compound RD-21 forms a nematic phase in the temperature range of about 70 to 82° C.

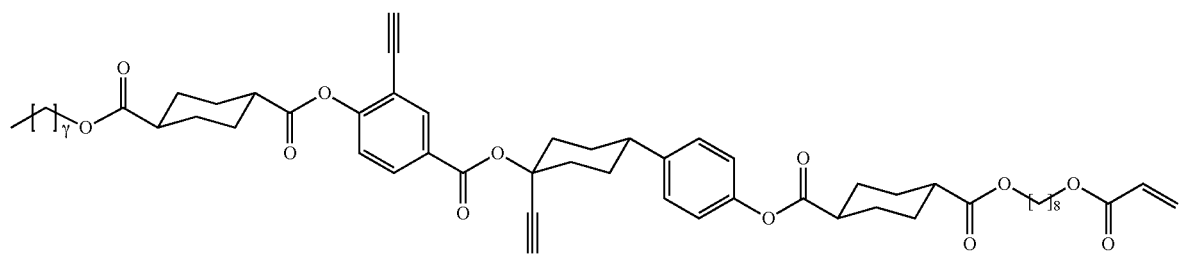

RD-21

Example 22

Synthesis of Compound RD-22

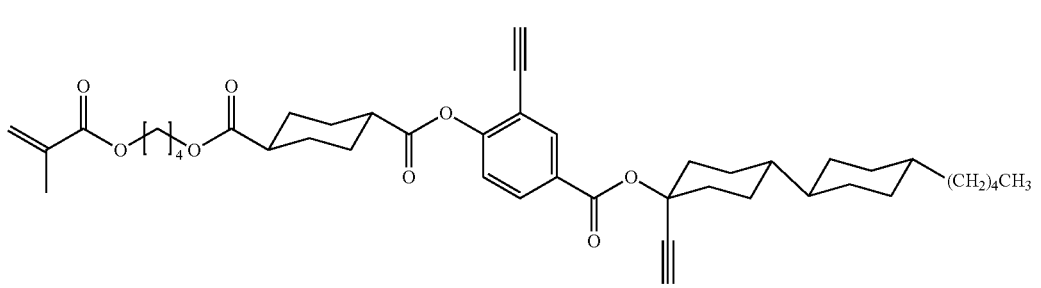

RD-22

Figure 6:
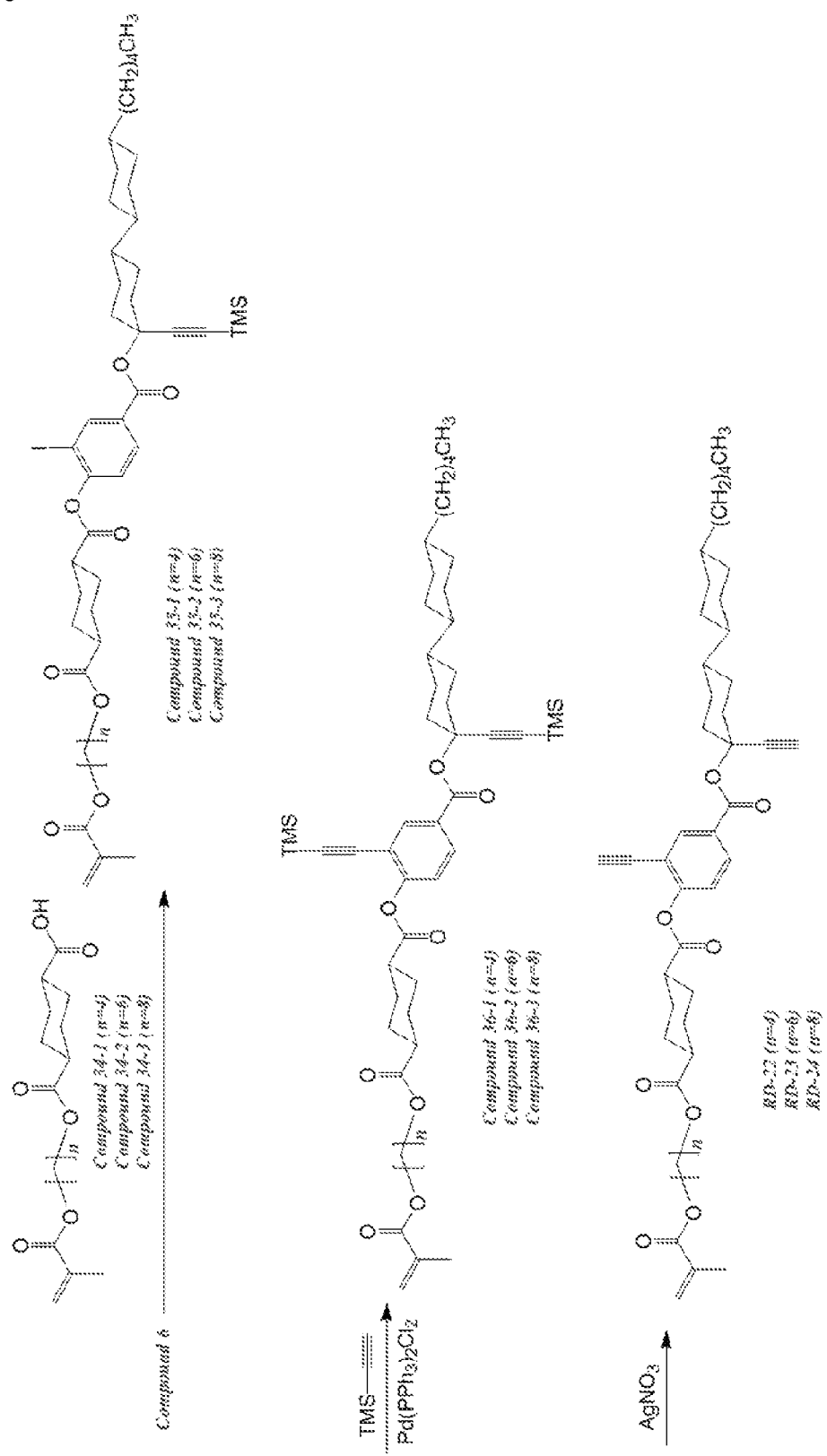

Compound RD-22 was synthesized according to the scheme shown in FIG. 6.

Synthesis of Compound 35-1

About 100 g of Compound 35-1 was obtained by the same method as the synthesis of Compound 8-1 of Example 1, except that Compound 34-1 ((1r,4r)-4-((4-(methacryloyloxy)butoxy)carbonyl)cyclohexanecarboxylic acid) was used instead of Compound 7-1.

Synthesis of Compound 36-1

About 70 g of Compound 36-1 was obtained by the same method as the synthesis of Compound 9-1 of Example 1, except that Compound 35-1 was used instead of Compound 8-1.

Synthesis of Compound RD-22

About 50 g of Compound RD-22 was obtained by the same method as the synthesis of Compound RD-01 of Example 1, except that Compound 36-1 was used instead of Compound 9-1.

The NMR spectrum of the obtained Compound RD-22 is as follows.

$^1$H NMR (CDCl$_3$, standard material TMS) δ(ppm): 8.40 (1H, s), 8.02 (1H, dd), 7.37 (1H, d), 6.48 (1H, d), 6.40 (1H, dd), 4.13 (2H, t), 4.05 (1H, s), 3.97 (2H, t), 3.52 (1H, s), 2.01 (3H, s), 1.60-1.12 (48H, m)

The structure of Compound RD-22 was observed with a polarization microscope and the phase transition temperature was measured. As a result, it was recognized that Compound RD-22 forms a nematic phase in the temperature range of about 25 to 85° C.

Example 23

Synthesis of Compound RD-23

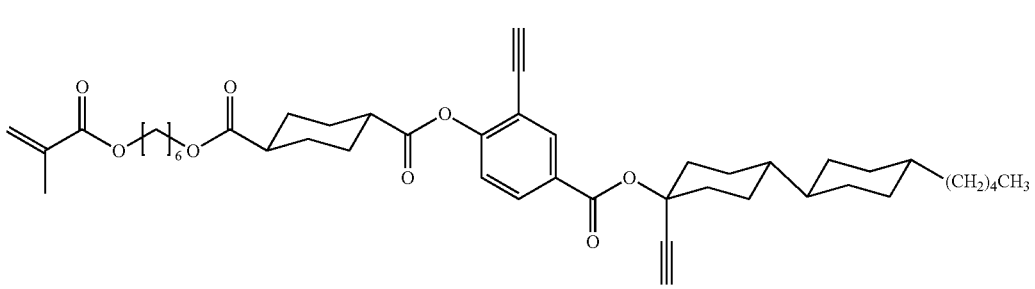

RD-23

Compound RD-23 was synthesized according to the scheme shown in FIG. 6.

Synthesis of Compound 35-2

About 100 g of Compound 35-2 was obtained by the same method as the synthesis of Compound 8-1 of Example 1, except that Compound 34-2 ((1r,4r)-4-(((6-(methacryloyloxy)hexyl)oxy)carbonyl)cyclohexanecarboxylic acid) was used instead of Compound 7-1.

Synthesis of Compound 36-2

About 70 g of Compound 36-2 was obtained by the same method as the synthesis of Compound 9-1 of Example 1, except that Compound 35-2 was used instead of Compound 8-1.

Synthesis of Compound RD-23

About 50 g of Compound RD-23 was obtained by the same method as the synthesis of Compound RD-01 of Example 1, except that Compound 36-2 was used instead of Compound 9-1.

The NMR spectrum of the obtained Compound RD-23 is as follows.

$^1$H NMR (CDCl$_3$, standard material TMS) δ(ppm): 8.40 (1H, s), 8.02 (1H, dd), 7.37 (1H, d), 6.48 (1H, d), 6.40 (1H, dd), 4.13 (2H, t), 4.05 (1H, s), 3.97 (2H, t), 3.52 (1H, s), 2.01 (3H, s), 1.60-1.12 (52H, m)

The structure of Compound RD-23 was observed with a polarization microscope and the phase transition temperature was measured. As a result, it was recognized that Compound RD-23 forms a nematic phase in the temperature range of about 25 to 84° C.

Example 24

Synthesis of Compound RD-24

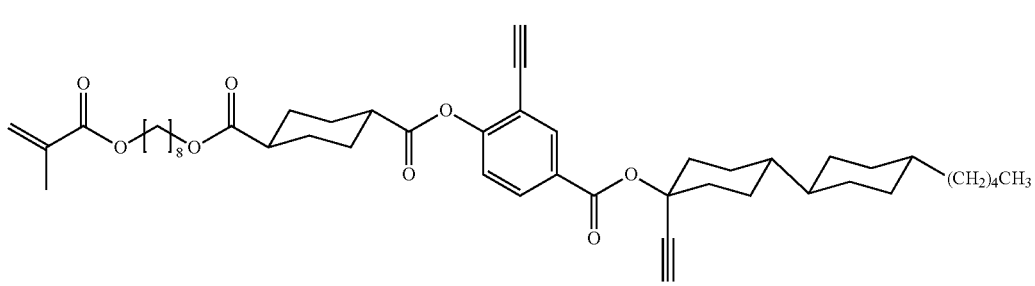

RD-24

Compound RD-24 was synthesized according to the scheme shown in FIG. 6.

Synthesis of Compound 35-3

About 100 g of Compound 35-3 was obtained by the same method as the synthesis of Compound 8-1 of Example 1, except that Compound 34-3 ((1r,4r)-4-(((8-(methacryloyloxy)octyl)oxy)carbonyl)cyclohexanecarboxylic acid) was used instead of Compound 7-1.

Synthesis of Compound 36-3

About 70 g of Compound 36-3 was obtained by the same method as the synthesis of Compound 9-1 of Example 1, except that Compound 35-3 was used instead of Compound 8-1.

Synthesis of Compound RD-24

About 50 g of Compound RD-24 was obtained by the same method as the synthesis of Compound RD-01 of Example 1, except that Compound 36-3 was used instead of Compound 9-1.

The NMR spectrum of the obtained Compound RD-24 is as follows.

$^1$H NMR (CDCl$_3$, standard material TMS) δ(ppm): 8.40 (1H, s), 8.02 (1H, dd), 7.37 (1H, d), 6.48 (1H, d), 6.40 (1H, dd), 4.13 (2H, t), 4.05 (1H, s), 3.97 (2H, t), 3.52 (1H, s), 2.01 (3H, s), 1.60-1.12 (56H, m)

The structure of Compound RD-24 was observed with a polarization microscope and the phase transition temperature was measured. As a result, it was recognized that Compound RD-24 forms a nematic phase in the temperature range of about 25 to 82° C.

Example 25

Synthesis of Compound RD-25

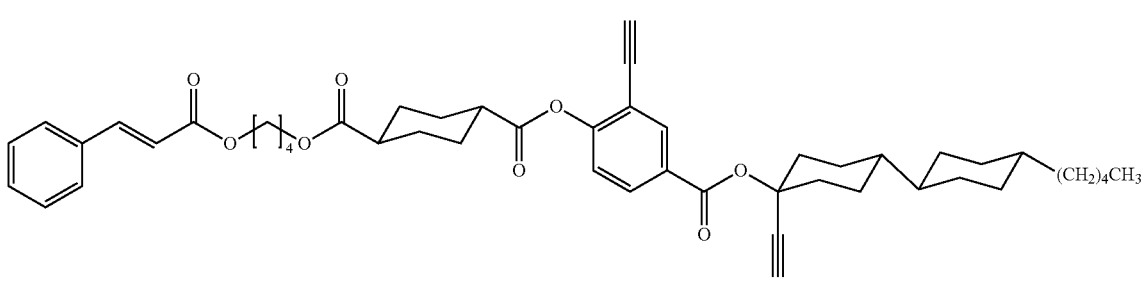

RD-25

Figure 7:
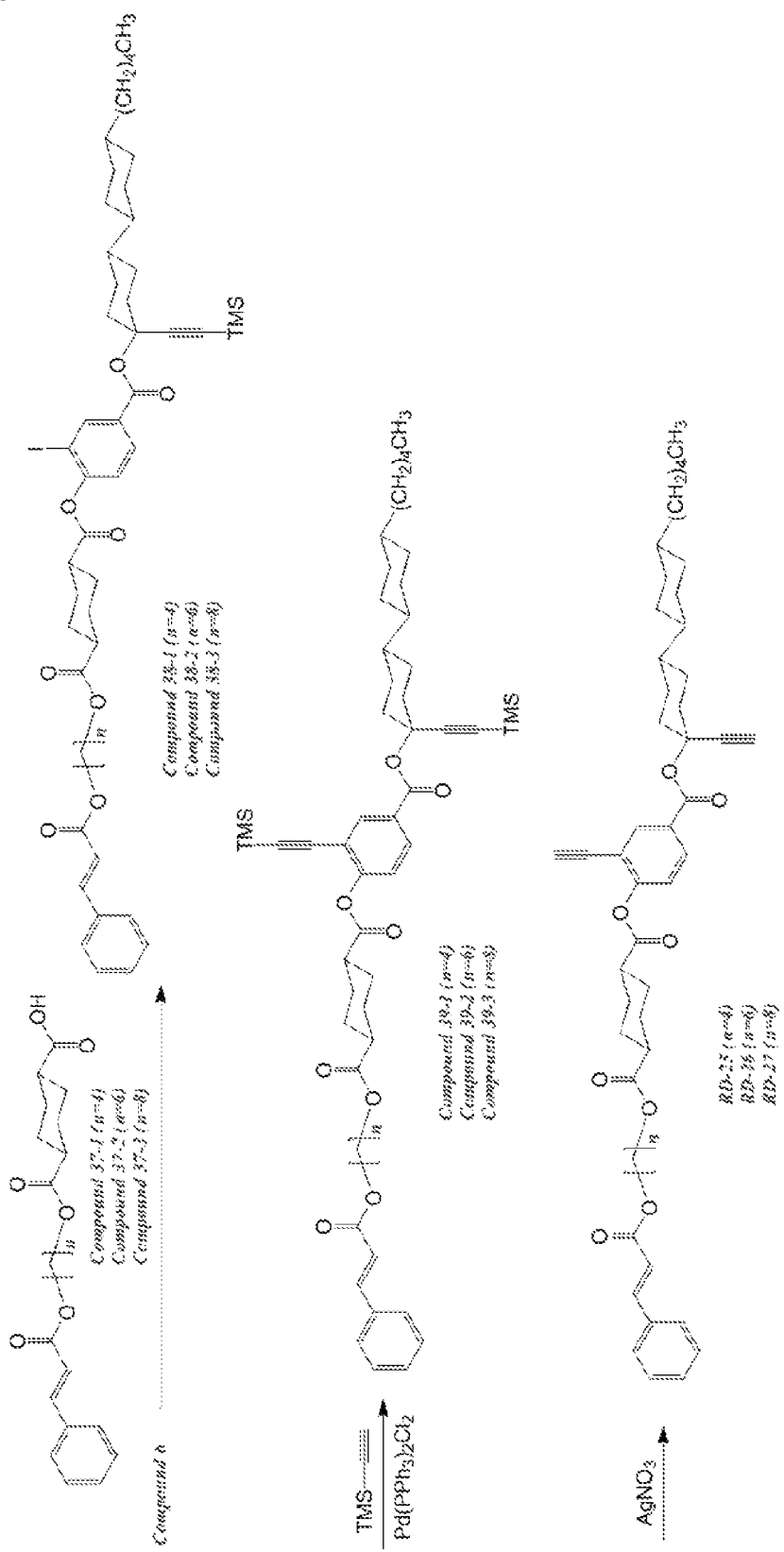

Compound RD-25 was synthesized according to the scheme shown in FIG. 7.

Synthesis of Compound 38-1

About 100 g of Compound 38-1 was obtained by the same method as the synthesis of Compound 8-1 of Example 1, except that Compound 37-1 ((1r,4r)-4-((4-(cinnamoyloxy)butoxy)carbonyl)cyclohexanecarboxylic acid) was used instead of Compound 7-1.

Synthesis of Compound 39-1

About 70 g of Compound 39-1 was obtained by the same method as the synthesis of Compound 9-1 of Example 1, except that Compound 38-1 was used instead of Compound 8-1.

Synthesis of Compound RD-25

About 50 g of Compound RD-25 was obtained by the same method as the synthesis of Compound RD-01 of Example 1, except that Compound 39-1 was used instead of Compound 9-1.

The NMR spectrum of the obtained Compound RD-25 is as follows.

$^1$H NMR (CDCl$_3$, standard material TMS) δ(ppm): 8.40 (1H, s), 8.02 (1H, dd), 7.60 (2H, d), 7.48 (1H, d), 7.40 (2H, d), 7.37 (1H, d), 7.33 (1H, t), 6.31 (1H, d), 4.13 (2H, t), 4.05 (1H, s), 3.97 (2H, t), 3.52 (1H, s), 1.60-1.12 (48H, m)

The structure of Compound RD-25 was observed with a polarization microscope and the phase transition temperature was measured. As a result, it was recognized that Compound RD-25 forms a nematic phase in the temperature range of about 43 to 88° C.

Example 26

Synthesis of Compound RD-26 except that Compound 37-2 ((1r,4r)-4-(((6-(cinnamoyloxy)hexyl)oxy)carbonyl)cyclohexanecarboxylic acid) was used instead of Compound 7-1.

Synthesis of Compound 39-2

About 70 g of Compound 39-2 was obtained by the same method as the synthesis of Compound 9-1 of Example 1, except that Compound 38-2 was used instead of Compound 8-1.

Synthesis of Compound RD-26

About 50 g of Compound RD-26 was obtained by the same method as the synthesis of Compound RD-01 of Example 1, except that Compound 39-2 was used instead of Compound 9-1.

The NMR spectrum of the obtained Compound RD-26 is as follows.

$^1$H NMR (CDCl$_3$, standard material TMS) δ(ppm): 8.40 (1H, s), 8.02 (1H, dd), 7.60 (2H, d), 7.48 (1H, d), 7.40 (2H, d), 7.37 (1H, d), 7.33 (1H, t), 6.31 (1H, d), 4.13 (2H, t), 4.05 (1H, s), 3.97 (2H, t), 3.52 (1H, s), 1.60-1.12 (52H, m)

The structure of Compound RD-26 was observed with a polarization microscope and the phase transition tempera-

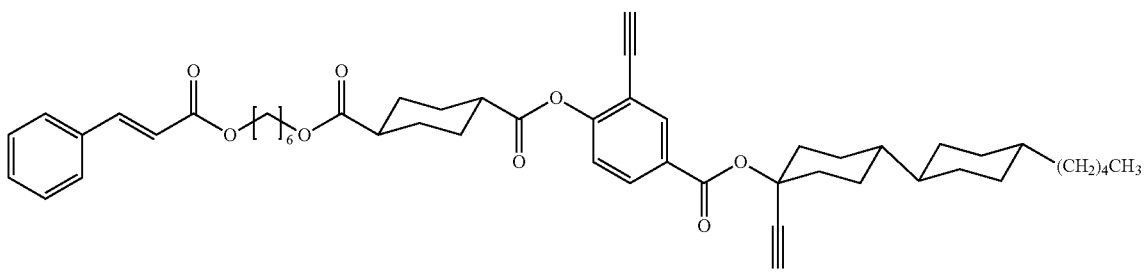

RD-26

Compound RD-26 was synthesized according to the scheme shown in FIG. 7.

Synthesis of Compound 38-2

About 100 g of Compound 38-2 was obtained by the same method as the synthesis of Compound 8-1 of Example 1, ture was measured. As a result, it was recognized that Compound RD-26 forms a nematic phase in the temperature range of about 41 to 84° C.

Example 27

Synthesis of Compound RD-27

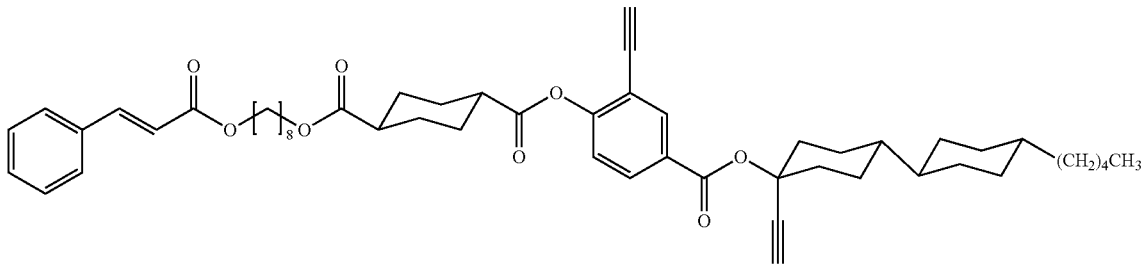

RD-27

Compound RD-27 was synthesized according to the scheme shown in FIG. 7.

Synthesis of Compound 38-3

About 100 g of Compound 38-3 was obtained by the same method as the synthesis of Compound 8-1 of Example 1, except that Compound 37-3 ((1r,4r)-4-(((8-(cinnamoyloxy)octyl)oxy)carbonyl)cyclohexanecarboxylic acid) was used instead of Compound 7-1.

Synthesis of Compound 39-3

About 70 g of Compound 39-3 was obtained by the same method as the synthesis of Compound 9-1 of Example 1, except that Compound 38-3 was used instead of Compound 8-1.

Synthesis of Compound RD-27

About 50 g of Compound RD-27 was obtained by the same method as the synthesis of Compound RD-01 of Example 1, except that Compound 39-3 was used instead of Compound 9-1.

The NMR spectrum of the obtained Compound RD-27 is as follows.

$^1$H NMR (CDCl$_3$, standard material TMS) δ(ppm): 8.40 (1H, s), 8.02 (1H, dd), 7.60 (2H, d), 7.48 (1H, d), 7.40 (2H, d), 7.37 (1H, d), 7.33 (1H, t), 6.31 (1H, d), 4.13 (2H, t), 4.05 (1H, s), 3.97 (2H, t), 3.52 (1H, s), 1.60-1.12 (56H, m)

The structure of Compound RD-27 was observed with a polarization microscope and the phase transition temperature was measured. As a result, it was recognized that Compound RD-27 forms a nematic phase in the temperature range of about 38 to 78° C.

Example 28

Synthesis of Compound RD-28

Figure 8A:
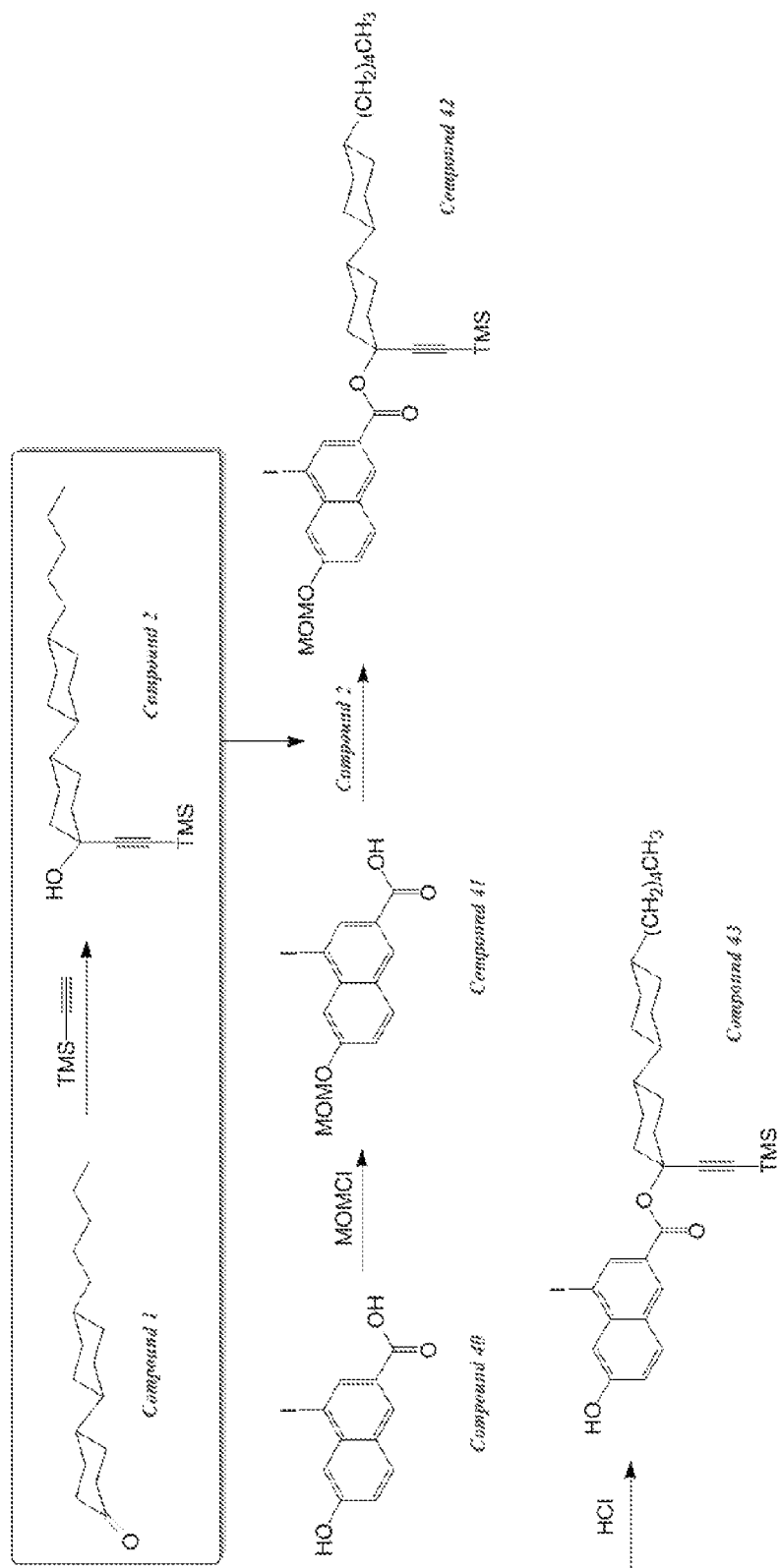
Figure 8B:
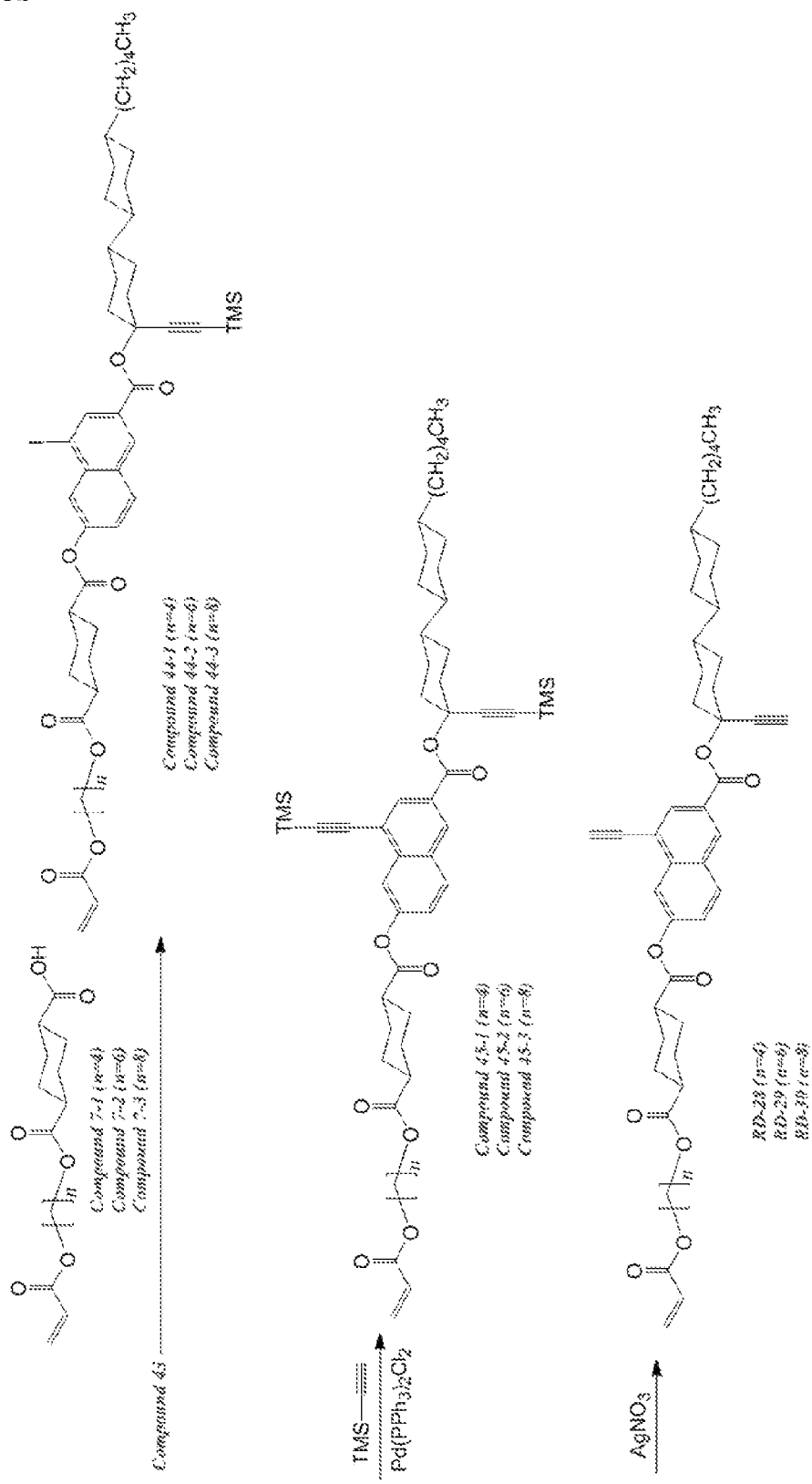

Compound RD-28 was synthesized according to the scheme shown in FIGS. 8a and 8b.

Synthesis of Compound 41

About 110 g of Compound 41 was obtained by the same method as the synthesis of Compound 4 of Example 1, except that Compound 40 (6-hydroxy-4-iodo-2-naphthoic acid) was used instead of Compound 3.

Synthesis of Compound 42

About 150 g of Compound 42 was obtained by the same method as the synthesis of Compound 5 of Example 1, except that Compound 41 was used instead of Compound 4.

Synthesis of Compound 43

About 80 g of Compound 43 was obtained by the same method as the synthesis of Compound 6 of Example 1, except that Compound 42 was used instead of Compound 5.

Synthesis of Compound 44-1

About 100 g of Compound 44-1 was obtained by the same method as the synthesis of Compound 8-1 of Example 1, except that Compound 43 was used instead of Compound 6.

Synthesis of Compound 45-1

About 70 g of Compound 45-1 was obtained by the same method as the synthesis of Compound 9-1 of Example 1, except that Compound 44-1 was used instead of Compound 8-1.

Synthesis of Compound RD-28

About 50 g of Compound RD-28 was obtained by the same method as the synthesis of Compound RD-01 of Example 1, except that Compound 45-1 was used instead of Compound 9-1.

The NMR spectrum of the obtained Compound RD-28 is as follows.

$^1$H NMR (CDCl$_3$, standard material TMS) δ(ppm): 8.51 (1H, s), 8.25 (1H, s), 8.06 (1H, d), 7.79 (1H, s), 7.30 (1H, d), 6.27 (1H, d), 6.05 (1H, dd), 5.59 (1H, d), 4.13 (2H, t), 4.05 (1H, s), 3.97 (2H, t), 3.52 (1H, s), 1.60-1.12 (48H, m)

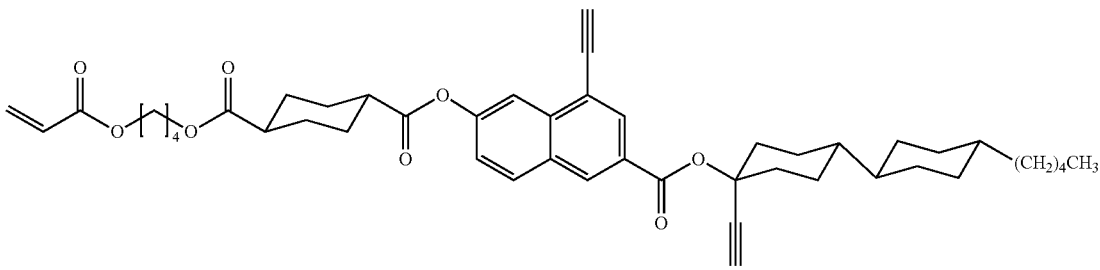

RD-28

The structure of Compound RD-28 was observed with a polarization microscope and the phase transition temperature was measured. As a result, it was recognized that Compound RD-28 forms a nematic phase in the temperature range of about 62 to 92° C.

Example 29

Synthesis of Compound RD-29

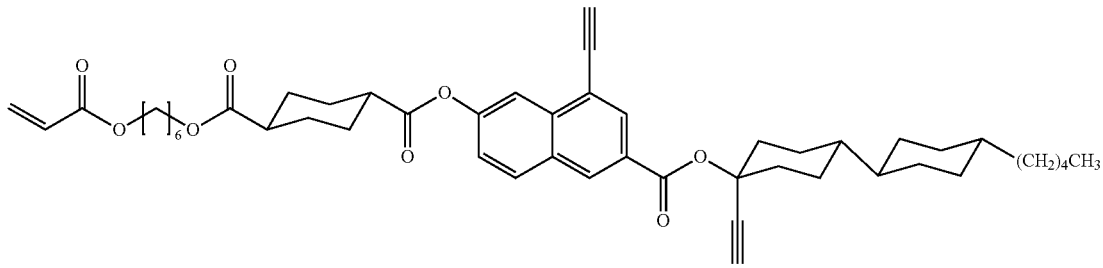

RD-29

Compound RD-29 was synthesized according to the scheme shown in FIGS. 8a and 8b.

Synthesis of Compound 44-2

About 100 g of Compound 44-2 was obtained by the same method as the synthesis of Compound 8-1 of Example 1, except that Compound 43 was used instead of Compound 6 and Compound 7-2 was used instead of Compound 7-1.

Synthesis of Compound 45-2

About 70 g of Compound 45-2 was obtained by the same method as the synthesis of Compound 9-1 of Example 1, except that Compound 44-2 was used instead of Compound 8-1.

Synthesis of Compound RD-29

About 50 g of Compound RD-29 was obtained by the same method as the synthesis of Compound RD-01 of Example 1, except that Compound 45-2 was used instead of Compound 9-1.

The NMR spectrum of the obtained Compound RD-29 is as follows.

$^1$H NMR (CDCl$_3$, standard material TMS) δ(ppm): 8.51 (1H, s), 8.25 (1H, s), 8.06 (1H, d), 7.79 (1H, s), 7.30 (1H, d), 6.27 (1H, d), 6.05 (1H, dd), 5.59 (1H, d), 4.13 (2H, t), 4.05 (1H, s), 3.97 (2H, t), 3.52 (1H, s), 1.60-1.12 (52H, m)

The structure of Compound RD-29 was observed with a polarization microscope and the phase transition temperature was measured. As a result, it was recognized that Compound RD-29 forms a nematic phase in the temperature range of about 59 to 87° C.

Example 30

Synthesis of Compound RD-30

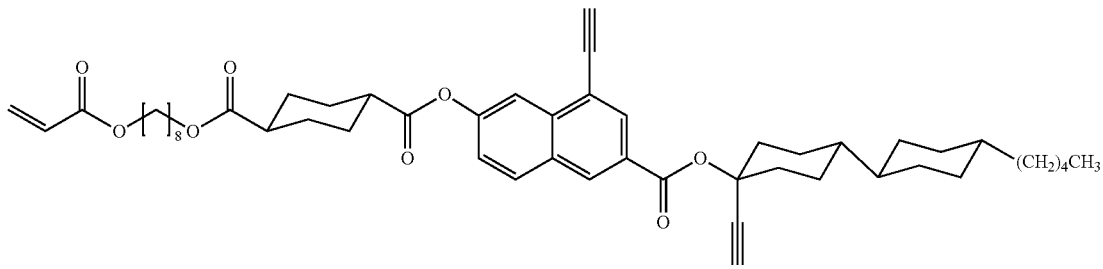

RD-30

Compound RD-30 was synthesized according to the scheme shown in FIGS. 8a and 8b.

Synthesis of Compound 44-3

About 100 g of Compound 44-3 was obtained by the same method as the synthesis of Compound 8-1 of Example 1, except that Compound 43 was used instead of Compound 6 and Compound 7-3 was used instead of Compound 7-1.

Synthesis of Compound 45-3

About 70 g of Compound 45-3 was obtained by the same method as the synthesis of Compound 9-1 of Example 1, except that Compound 44-3 was used instead of Compound 8-1.

Synthesis of Compound RD-30

About 50 g of Compound RD-30 was obtained by the same method as the synthesis of Compound RD-01 of Example 1, except that Compound 45-3 was used instead of Compound 9-1.

The NMR spectrum of the obtained Compound RD-30 is as follows.

$^1$H NMR (CDCl$_3$, standard material TMS) δ(ppm): 8.51 (1H, s), 8.25 (1H, s), 8.06 (1H, d), 7.79 (1H, s), 7.30 (1H, d), 6.27 (1H, d), 6.05 (1H, dd), 5.59 (1H, d), 4.13 (2H, t), 4.05 (1H, s), 3.97 (2H, t), 3.52 (1H, s), 1.60-1.12 (56H, m)

The structure of Compound RD-30 was observed with a polarization microscope and the phase transition temperature was measured. As a result, it was recognized that Compound RD-30 forms a nematic phase in the temperature range of about 56 to 82° C.

Preparation Example 1

Preparation of Composition for Optical Elements

The composition for optical elements was prepared by mixing about 90 wt % of Compound RD-01 according to Example 1, about 5 wt % of a mesogenic compound represented by the following Chemical Formula a, about 2 wt % of a mesogenic compound represented by the following Chemical Formula b, about 1 wt % of an initiator (Irgacure 907, Ciba-Geigy Co.), about 1 wt % of an antioxidant (Irganox 1076, Ciba-Geigy Co.), and about 1 wt % of a fluorine-based surfactant (FC-171, 3M Co.).

Preparation of Retardation Film

Said composition was coated by a roll coating method on a TAC film on which a cinnamate-based light alignment material had been coated, and dried for 2 min at about 50° C. in order to align the liquid crystal molecules. Subsequently, the retardation film was prepared by the method of exposing the film to non-polarized UV originated from a high pressure mercury lamp of 200 mW/cm$^2$ for fixing the aligned state of the liquid crystal.

The quantitative retardation value of the prepared retardation film was measured by using Axoscan equipment (manufactured by Axomatrix Co.). At this time, the thickness of the film was measured independently and the retardation value (Δn·d) was obtained from the obtained value. As a result, it was recognized that a Δn·d$_{(550\ nm)}$ value was about 212 and a Δn$_{(450\ nm)}$/Δn$_{(550\ nm)}$ value was about 1.00.

Preparation Example 2

The retardation film was prepared by the same method as in Preparation Example 1, except that about 80 wt % of Compound RD-01, about 12 wt % of the compound of Chemical Formula a, and about 5 wt % of the compound of Chemical Formula b were used as the liquid crystal compounds.

The quantitative retardation value of the prepared retardation film was measured by using Axoscan equipment (manufactured by Axomatrix Co.). At this time, the thickness of the film was measured independently and the retardation value (Δn·d) was obtained from the obtained value. As a result, it was recognized that a Δn·d$_{(550\ nm)}$ value was about 250 and a Δn$_{(450\ nm)}$/Δn$_{(550\ nm)}$ value was about 1.02.

Comparative Preparation Example 1

The retardation film was prepared by the same method as in Preparation Example 1, except that about 92 wt % of the compound of Chemical Formula a and about 5 wt % of the compound of Chemical Formula b were used as the liquid crystal compounds without using Compound RD-01.

The quantitative retardation value of the prepared retardation film was measured by using Axoscan equipment (manufactured by Axomatrix Co.). At this time, the thickness of the film was measured independently and the retardation value (Δn·d) was obtained from the obtained value. As a result, it was recognized that a Δn·d$_{(550\ nm)}$ value was about 210 and a Δn$_{(450\ nm)}$/n$_{(550\ nm)}$ value was about 1.09.

[Chemical Formula a]

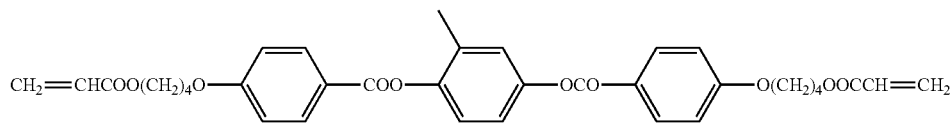

[Chemical Formula b]

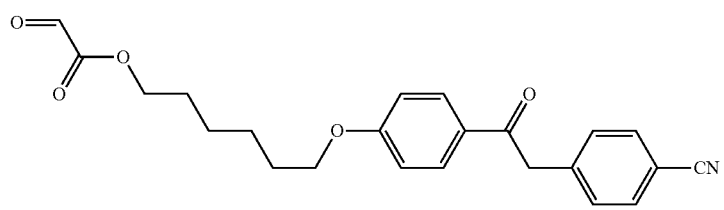

The invention claimed is:
1. A polymerizable liquid crystal compound represented by the following Chemical Formula 1:

[Chemical Formula 1]

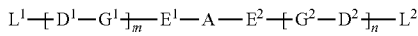

wherein, in Chemical Formula 1,
A, $G^1$, and $G^2$ are independently a $C_5$-$C_8$ non-aromatic carbocyclic or heterocyclic group or a $C_6$-$C_{20}$ aromatic or heteroaromatic group;
$E^1$, $E^2$, $D^1$, and $D^2$ are independently a single bond or a divalent connecting group;
$L^1$ and $L^2$ are independently —H, —F, —Cl, —Br, —I, —CN, —NC, —NCO, —OCN, —SCN, —C(=O)NR$^1$R$^2$, —C(=O)R$^1$, —O—C(=O)R$^1$, —NH$_2$, —SH, —SR$^1$, —SO$_3$H, —SO$_2$R$^1$, —OH, —NO$_2$, —CF$_3$, —SF$_3$, a substituted or non-substituted silyl, a substituted or non-substituted $C_1$-$C_{40}$ carbyl or hydrocarbyl, or —S$_p$—P, wherein at least one of said $L^1$ and $L^2$ are —S$_p$—P, said P is a polymerizable group, said S$_p$ is a spacer group or a single bond, and R$^1$ and R$^2$ are independently —H or a $C_1$-$C_{12}$ alkyl;
m and n are independently an integer of 1 to 5, wherein if said m or n is 2 or more, each repeating unit of -(D$^1$-G$^1$)- or -(G$^2$-D$^2$)- repeated twice or more may be same as or different from each other; and
two or more of hydrogens connected to the sp$^2$-hybridized carbon and sp$^3$-hybridized carbon included in A, $E^1$, $E^2$, $D^1$, $D^2$, $G^1$, $G^2$, $L^1$, and $L^2$ are substituted by —F, —Cl, —Br, —I, —CN, —NC, —NCO, —OCN, —SCN, —C(=O)NR$^1$R$^2$, —C(=O)R$^1$, —NH$_2$, —SH, —SR$^1$, —SO$_3$H, —SO$_2$R$^1$, —OH, —NO$_2$, —CF$_3$, —SF$_3$, a $C_2$-$C_6$ alkenyl group, a $C_2$-$C_6$ alkynyl group, a $C_2$-$C_4$ acyl group, a $C_2$-$C_6$ alkynylene group of which the end is connected with a $C_2$-$C_4$ acyl group, a $C_1$-$C_5$ alcohol group, or a $C_1$-$C_{12}$ alkoxy group, wherein said R$^1$ and R$^2$ are independently —H or a $C_1$-$C_{12}$ alkyl.

2. The polymerizable liquid crystal compound according to claim 1, wherein A, $G^1$, and $G^2$ in Chemical Formula 1 are independently a cyclohexane ring, a cyclohexene ring, a benzene ring, a naphthalene ring, or a phenanthrene ring.

3. The polymerizable liquid crystal compound according to claim 1, wherein $E^1$, $E^2$, $D^1$, and $D^2$ in Chemical Formula 1 are independently a single bond, —O—, —S—, —CO—, —COO—, —OCO—, —O—COO—, —CO—NR$^1$—, —NR$^1$—CO—, —NR$^1$—CO—NR$^1$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CF$_2$CH$_2$—, —CH=CH—, —CY$^1$=CY$^2$—, —CH=N—, —N=CH—, —N=N—, —CH=CR$^1$—, —C≡C—, —CH=CH—COO—, —OCO—CH=CH—, or —CR$^1$R$^2$—, wherein said Y$^1$ and Y$^2$ are independently —H, —F, —Cl, —CN, or —R$^1$, and said R$^1$ and R$^2$ are independently —H or a $C_1$-$C_{12}$ alkyl.

4. The polymerizable liquid crystal compound according to claim 1, wherein P in Chemical Formula 1 is CH$_2$=CZ$^1$—COO—, CH$_2$=CZ$^1$—CO—, CH$_2$=CZ$^2$—(O)$_a$—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CZ$^1$Z$^2$—, HS—CZ$^1$Z$^2$—, HZ$^1$N—, HO—CZ$^1$Z$^2$—NH—, CH$_2$=CZ$^1$—CO—NH—, CH$_2$=CH—(COO)$_a$-Phe-(O)$_b$—, CH$_2$=CH—(CO)$_a$-Phe-(O)$_b$—, Phe-CH=CH—, HOOC—, OCN—, Z$^1$Z$^2$Z$^3$Si—,

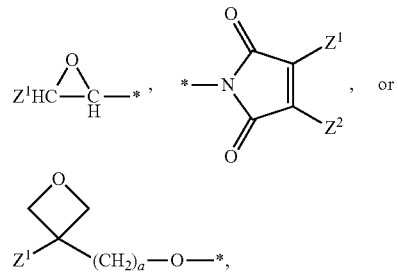

said Z$^1$ to Z$^3$ are independently —H, —F, —Cl, —CN, —CF$_3$, phenyl, or a $C_1$-$C_5$ alkyl,
said Phe is 1,4-phenylene that is non-substituted or substituted with —F, —Cl, —Br, —I, —CN, —NC, —NCO, —OCN, —SCN, —C(=O)NR$^1$R$^2$, —C(=O)R$^1$, —NH$_2$, —SH, —SR$^1$, —SO$_3$H, —SO$_2$R$^1$, —OH, —NO$_2$, —CF$_3$, or —SF$_3$, and
said a and b are independently 0 or 1.

5. The polymerizable liquid crystal compound according to claim 1, wherein said S$_p$ in Chemical Formula 1 is selected from Chemical Formula —X'—S$_p$'— that makes —S$_p$—P into —X'—S$_p$'—P,
said S$_p$' is a $C_1$-$C_{20}$ alkylene that is mono-substituted or multi-substituted with —F, —Cl, —Br, —I, or —CN, and one or more —CH$_2$— groups of the alkylene can be replaced by —O—, —S—, —NH—, —NR$^1$—, —SiR$^1$R$^2$—, —CO—, —COO—, —OCO—, —OCO—O—, —S—CO—, —CO—S—, —NR$^1$—CO—O—, —O—CO—NR$^1$—, —NR$^1$—CO—NR$^1$—, —CH=CH—, or —C≡C—,
said X' is —O—, —S—, —CO—, —COO—, —OCO—, —O—COO—, —CO—NR$^1$—, —NR$^1$—CO—, —NR$^1$—CO—NR$^1$—, —OCH$_2$—, —CH$_2$O—, —SCH$_2$—, —CH$_2$S—, —OCF$_2$—, —CF$_2$O—, —SCF$_2$—, —SF$_2$O—, —CF$_2$CH$_2$—, —CF$_2$CF$_2$—, —CH=N—, —N=CH—, —N=N—, —CH=CR$^1$—, —CY$^1$=CY$^2$—, —C≡C—, —CH=CH—COO—, —OCO—CH=CH—, or a single bond,
said Y$^1$ and Y$^2$ are independently —H, —F, —Cl, —CN, or —R$^1$, and
said R$^1$ and R$^2$ are independently —H or a $C_1$-$C_{12}$ alkyl.

6. A polymerizable liquid crystal composition, including the compound according to claim 1.

7. An optical film prepared by using the polymerizable liquid crystal composition according to claim 6.

* * * * *